United States Patent [19]
Kato et al.

[11] Patent Number: 5,793,794
[45] Date of Patent: Aug. 11, 1998

[54] SPREAD SPECTRUM RECEIVING APPARATUS

[75] Inventors: Ichiro Kato, Kawasaki; Katsuo Saito, Yokohama; Toshihiko Myojo, Tokyo; Norihiro Mochizuki, Yokohama; Hidetada Nago, Yokohama; Tetsuo Kanda, Yokohama, all of Japan

[73] Assignee: Canon Kabushiki Kaisha, Tokyo, Japan

[21] Appl. No.: 233,244

[22] Filed: Apr. 26, 1994

[30] Foreign Application Priority Data

| Apr. 30, 1993 | [JP] | Japan | 5-128052 |
| May 28, 1993 | [JP] | Japan | 5-151219 |
| May 28, 1993 | [JP] | Japan | 5-151220 |
| Dec. 20, 1993 | [JP] | Japan | 5-344920 |

[51] Int. Cl.$^6$ ........................ H04B 1/69
[52] U.S. Cl. ............ 375/200; 375/367; 375/206
[58] Field of Search .................. 375/200, 206, 375/327, 367; 370/18, 107, 208, 515; 381/46

[56] References Cited

U.S. PATENT DOCUMENTS

| 4,494,238 | 1/1985 | Groth, Jr. . | |
| 4,532,635 | 7/1985 | Mangulis | 375/367 |
| 4,894,841 | 1/1990 | Martinino et al. | 375/206 |
| 4,926,440 | 5/1990 | Mikoshiba et al. . | |
| 5,003,552 | 3/1991 | Mower | 375/206 |
| 5,048,052 | 9/1991 | Hamatsu et al. . | |
| 5,099,495 | 3/1992 | Mikoshiba et al. . | |
| 5,177,767 | 1/1993 | Kato . | |
| 5,204,877 | 4/1993 | Endo et al. . | |
| 5,228,055 | 7/1993 | Uchida et al. . | |
| 5,235,612 | 8/1993 | Stilwell et al. . | |
| 5,235,614 | 8/1993 | Bruckert et al. . | |
| 5,260,969 | 11/1993 | Kato et al. | 375/367 |
| 5,280,538 | 1/1994 | Kataoka et al. . | |
| 5,299,229 | 3/1994 | Zscheile, Jr. et al. | 375/367 |

FOREIGN PATENT DOCUMENTS

| 0369375 | 5/1990 | European Pat. Off. . |
| 3901639 | 8/1989 | Germany . |
| 4003671 | 8/1990 | Germany . |
| 4009458 | 9/1990 | Germany . |
| 5-22249 | 1/1993 | Japan . |
| WO91/03892 | 3/1991 | WIPO . |

*Primary Examiner*—Don N. Vo
*Attorney, Agent, or Firm*—Morgan & Finnegan, L.L.P.

[57] ABSTRACT

A spread spectrum receiving apparatus comprises: a reproducing circuit to reproduce a carrier signal from a reception signal and a diffusion code; a demodulation circuit to demodulate the reception signal into a base band signal on the basis of the carrier signal reproduced by the reproducing circuit; and a judgment circuit to judge the reception data from the base band signal from the demodulation circuit. The reproducing circuit has an operation circuit to arithmetically operate the reception signal and the diffusion code and a detection circuit to detect a difference between the phases of an output of the operation circuit and an output of an oscillator. The oscillator oscillates at a carrier frequency in accordance with a phase difference detected by the detecting circuit.

47 Claims, 24 Drawing Sheets

SPREAD SPECTRUM RECEIVING APPARATUS

BACKGROUND OF THE INVENTION

1. Field of the Invention

The present invention relates to an apparatus to receive a spread spectrum signal.

2. Related Background Art

Generally, in a spread spectrum communication system using a direct sequence system, a baseband signal having a fairly wide bandwidth as compared with original data is generated from a baseband signal of a digital signal which is usually transmitted by using a spreading code series such as a pseudo noise (PN) code or the like on the transmission side. The baseband signal is converted to a radio frequency (RF) signal by performing a modulation such as phase shift keying (PSK), frequency shift keying (FSK), or the like, and is transmitted.

On the reception side, a reception signal is converted to a narrowband signal having a bandwidth corresponding to the original data by performing an de-spread which obtains a correlation with the reception signal by using the same spreading code as that on the transmission side. Subsequently, an ordinary data demodulation is executed, thereby reproducing the original data.

As mentioned above, in the spread spectrum communication system, since the transmission bandwidth is fairly wider than an information bandwidth, only a transmission speed which is very low as compared with that of the ordinary narrowband modulation system can be realized under a condition such that the transmission bandwidth is constant.

Accordingly, a method called a code division multiplex exists in order to solve the above problem. According to such a method, an information signal of a high speed is converted to parallel data of a low speed, those parallel data are spread by different spreading code series and are added and, after that, the addition signal is converted to an RF signal. By transmitting the converted RF signal, a data transmission of a high speed is realized under a condition such that a transmission bandwidth is constant without decreasing a processing gain of the spreading.

FIG. 15 is a block diagram showing a construction of a transmitter according to the above system.

Input data is converted into (n) parallel data by a serial/parallel converter 301. The converted parallel data are multiplied by (n) different spreading code outputs from a spreading code generator 303 in (n) multipliers 302-1 to 302-n, respectively, and are converted to wide band spread signals of (n) channels. Subsequently, outputs of the multipliers 302-1 to 302-n are added by an adder 304 and the resultant value is output to a high frequency stage (RF) 305. The added baseband wide band spreading signal is converted to a transmission frequency signal having a proper center frequency by the RF 305 and is transmitted from a transmission antenna 306.

FIG. 16 is a block diagram showing a construction of a receiver.

The signal received by a reception antenna 401 is properly filtered and amplified by a high frequency signal processing section (RF) 402 and is converted to an intermediate frequency signal. The intermediate frequency signal is distributed to channels corresponding to the (n) spreading codes which are connected in parallel. In the channels, correlations between the input signals and outputs from a group of spreading code generators 404-1 to 404-n corresponding to the channels are detected by a group of correlators 403-1 to 403-n, thereby performing the de-spread.

The de-spread signals are input to a group of sync circuits 405-1 to 405-n, by which synchronization is established every channel and code phases in the spreading code generators 404-1 to 404-n are made coincide with the clocks. The despread signals are input to a group of demodulators 406-1 to 406-n and are demodulated, thereby reproducing the data. Subsequently, the reproduced data are converted to serial data by a parallel/serial converter 407 and the original information is reproduced.

In the above conventional apparatus, however, since correlators of demodulation channels have operated at an intermediate frequency stage, there is a drawback such that a circuit scale is fairly large. The drawback is remarkable especially when the number of code division multiplexes increases.

In order to execute a normal demodulating operation in each demodulation channel, a code phase synchronization and a clock synchronization must be established for the transmission spreading code included in the reception signal of the output from each spreading code generator. However, it is necessary to provide a sync circuit for this purpose in each channel and such a point also becomes a cause of an increase in circuit scale.

A spread spectrum communication apparatus using a direct sequences system has a construction such that in a sync control using an SAW convolver, by matching the phases and code generating positions of the correlation output obtained from the SAW convolver and the spreading codes for reference, the initial synchronization and the tracking are executed.

For example, at the time of communication start, first, on the transmission side, a preamble pattern for initial synchronization is transmitted and an initial acquisition is executed. As for the transmission of a preamble in this instance, in case of the same continuous data (for example, all "1"), from the characteristics of the SAW convolver at which a correlation output can be also obtained at a ½ period other than a correlation output of every one code length, the preamble pattern is constructed by a pattern of "0" and "1" so that the acqusition is not executed at the ½ period. In the initial acquisition, a waveform of the correlation output at the time of preamble transmission is shaped and a mask signal at the position of ½ period pulse is formed and the operation is finished.

After such an initial acquisition was finished, a tracking is executed for the correlation output between the transmission signal including data and the reference spreading code while holding the mask signal timing position where the initial acquisition was executed.

When such a code division multiplex communication as mentioned above is executed, however, since a pseudo correlation output is increased due to a cross correlation among the code channels which are multiplexed, there is a problem such that an erroneous operation occurs in the acquisition operation and the tracking operation due to the pseudo correlation output and the signal cannot be correctly demodulated. Therefore, there is a drawback such that it is impossible to increase the number of multiplex channels so much. Accordingly, there is also a drawback such that it is difficult to realize a high speed data transmission.

SUMMARY OF THE INVENTION

It is an object of the present invention to realize a miniaturization and a high integration of an apparatus which receives a spread spectrum signal.

Another object of the invention is to provide a spread spectrum receiving apparatus for reproducing a carrier signal from a reception signal and a spreading code, for demodulating the reception signal to a baseband signal on the basis of the carrier signal, and for judging the reception data from the baseband signal.

Still another object of the invention is to provide a receiving apparatus for demodulating a reception signal to a baseband signal, for converting the baseband signal to a digital signal synchronously with a code clock of a spreading code, for judging the reception data on the basis of the digital signal, and for judging a reliability of the reception data.

Further another object of the invention is to realize a miniaturization and a high integration of an apparatus to receive a code division multiplexed signal.

Further another object of the invention is to provide a receiving apparatus for reproducing a carrier signal from a reception signal and a spreading code, for demodulating the reception signal to a baseband signal on the basis of a carrier signal, and for judging a plurality of code division multiplexed reception data from the baseband signal on the basis of a plurality of spreading codes.

Further another object of the invention is to provide a spread spectrum communication apparatus which can certainly obtain a synchronization in case of communicating a plurality of data in parallel by using a plurality of spreading codes.

The above and other objects and features of the present invention will become apparent from the following detailed description and the appended claims with reference to the accompanying drawings.

DETAILED DESCRIPTION OF THE PREFERRED EMBODIMENTS

Figure 1:
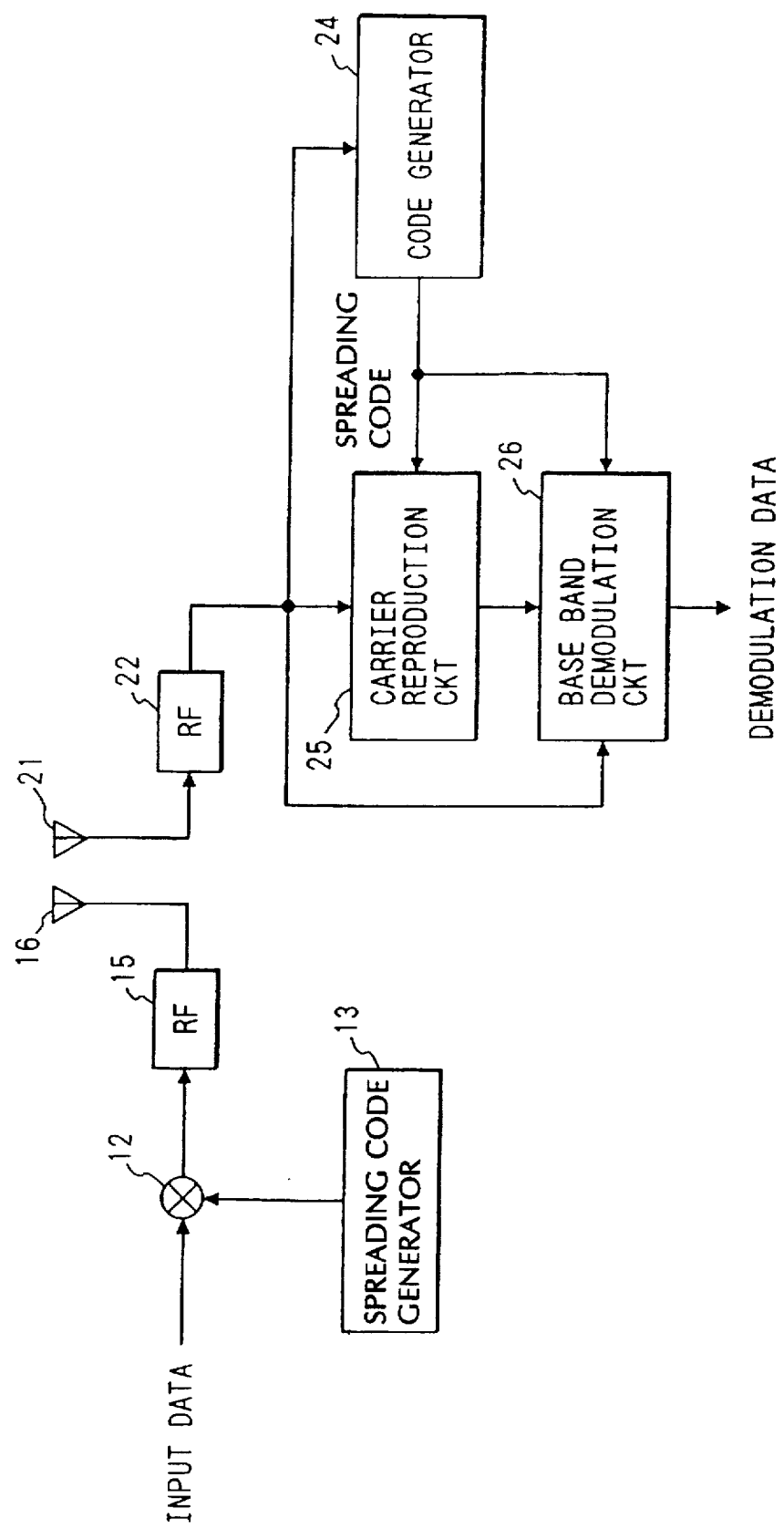
FIG. 1 is a constructional diagram of a first spread spectrum communication system embodying the invention.

FIG. 1 shows a construction of the first spread spectrum communication system embodying the invention.

On the transmission side, reference numeral 12 denotes a multiplier to multiply input data by a spreading code from a spreading code generator 13. Reference numeral 15 denotes a radio frequency process unit (RF) to convert an output of the multiplier 12 to a transmission frequency signal to be transmitted from an antenna 16.

On the reception side, reference numeral 22 indicates a radio frequency process unit (RF) for filtering and amplifying an output from an antenna 21 and for generating a transmission frequency band signal as it is or generating after it was converted to a proper intermediate frequency band signal. Reference numeral 24 denotes a code generator to generate a code synchronized with a spreading code which is generated from the spreading code generator 13 on the transmission side; 25 a carrier reproduction circuit to reproduce a carrier signal from the code generated by the code generator 24 and an output of the RF 22; 26 a baseband demodulation circuit to demodulate in a baseband by using an output of the carrier reproduction circuit 25, the output of the RF 22, and the code from the code generator 24.

Figure 2:
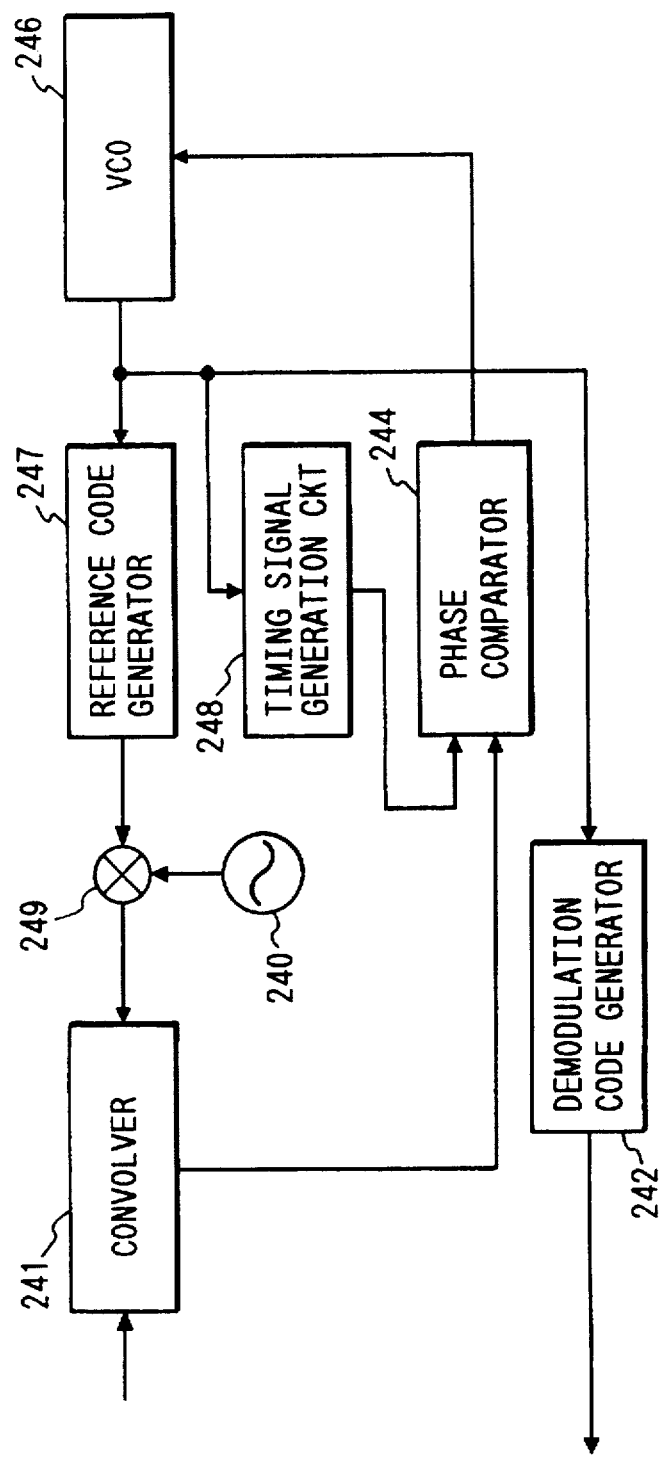
FIG. 2 is a constructional diagram of a code generator when a convolver is used.

FIG. 2 shows a construction of the code generator 24 when a convolver is used.

Reference numeral 246 denotes a voltage controlled oscillator (VCO) to oscillate at a frequency near a clock frequency of the spreading code from the spreading code generator 13 on the transmission side in a state in which no synchronization is established. Reference numeral 247 denotes a reference code generator to generate a reference code which is obtained by inverting the spreading code from the spreading code generator on the time base synchronously with an output of the VCO 246. When it is now assumed that spreading codes are $|P_1, P_2, P_3, \ldots, P_{n-1}, P_n|$, reference codes are $|P_n, P_{n-1}, \ldots, P_3, P_2, P_1,|$ (where each of $P_1, P_2, \ldots, P_n$ is set to 0 or 1).

Reference numeral 248 denotes a timing signal generation circuit to generate pulses at a starting point of one period of the reference code. That is, when it is now assumed that the reference code comprises 256 bits, the timing signal generation circuit 248 generates pulses at the starting point of the code generation by the code generator 24. After that, when 256 pulses are generated from the VCO 246, the timing signal generation circuit 248 again generates pulses.

Reference numeral 240 denotes a local oscillator to oscillate at a frequency corresponding to the frequency of the signal generated from the RF 22. Reference numeral 249 indicates a mixer to multiply the output of the oscillator 240 by the reference code from the reference code generator 247.

Reference numeral 241 denotes a convolver to output a signal having a peak when the spreading code from the generator 13 included in the output from the RF 22 coincides with the reference code included in the output of the mixer 249. Reference numeral 244 indicates a phase comparator. The phase comparator 244 outputs a voltage according to a phase difference between the peak after an output of the convolver 241 was envelope detected and an output of the timing signal generation circuit 248 and adjusts an oscillation frequency of the VCO 246 so as to eliminate the phase difference.

Reference numeral 242 denotes a demodulation code generator to output the same code as the spreading code from the spreading code generator on the transmission side synchronously with the output of the VCO 246. The demodulation code generator 242 is set so as to generate a code simultaneously with the reference code generator. Namely, at the start time of the reception, the demodulation code generator 242 and the reference code generator 247 are simultaneously reset and the code generation is started. The timing signal generation circuit 248 also generates pulses.

Figure 3:
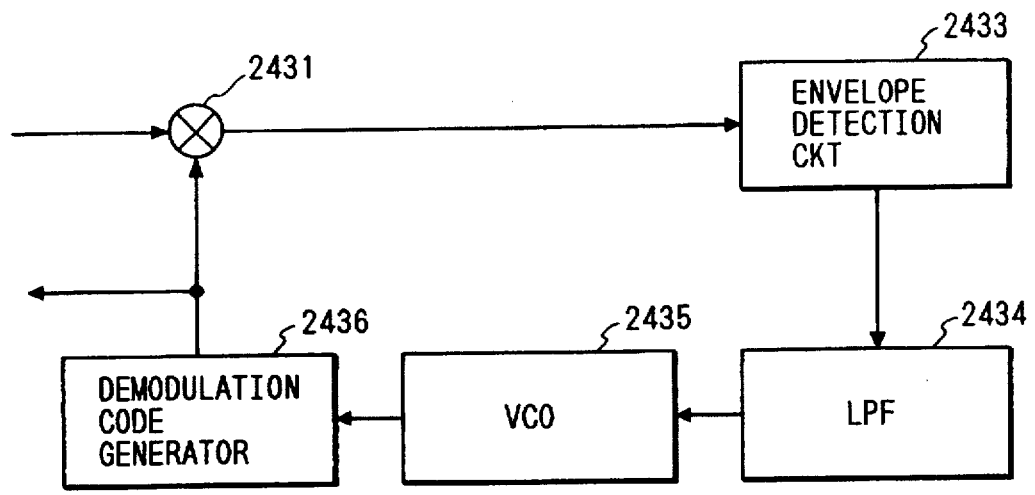
FIG. 3 is a constructional diagram of a code generator when a sliding correlation loop is used.

FIG. 3 shows a construction of the code generator 24 when a sliding correlation loop is used. Reference numeral 2431 denotes a mixer to multiply an output of the RF 22 by an output of a demodulation code generator 2436; 2433 an envelope detection circuit to envelope detect an output component of the mixer 2431 corresponding to the frequency of the signal to be generated from the mixer 2431 when a synchronization is obtained; 2434 a low pass filter (LPF) for smoothing an output of the envelope detection circuit 2433 and converting into a DC level signal; and 2435 a VCO to generate a signal of a frequency according to the output voltage of the LPF 2434 as a clock sync signal to the demodulation code generator 2436. The demodulation code generator 2436 generates the same demodulation code as the spreading code from the spreading code generator on the transmission side.

In a state in which no synchronization is established, the output of the mixer 2431 is small and, accordingly, the output of the LPF 2434 is also small. When a micro voltage is input, the VCO 2435 generates a signal of a frequency which is slightly different from that of the spreading code generator 13 on the transmission side. Therefore, the phase of the demodulation code from the demodulation code generator 2436 gradually deviates from the phase of the spreading code from the spreading code generator 13 included in the output of the RF 22.

As a result, the phases of both codes coincide for a time interval during which the phases are deviated by the amount of one period, so that a code synchronization is obtained. Then, a DC output voltage of the LPF 2434 rises and an oscillation frequency of the VCO 2435 is locked by the present frequency.

Figure 4:
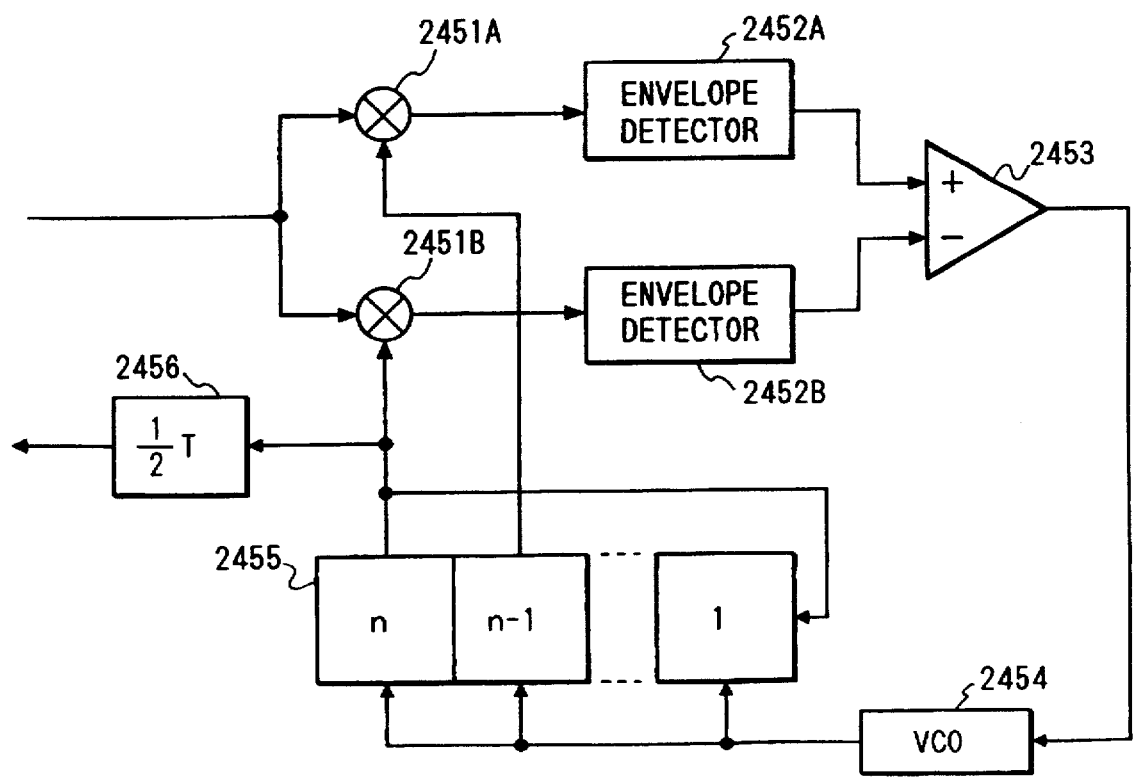
FIG. 4 is a constructional diagram of a code generator when a delay locked loop is used.

FIG. 4 shows a construction of the code generator 24 when a delay locked loop is used.

Reference numeral 2455 denotes a demodulation code generator of a shift register type. When a clock from a voltage controlled oscillator (VCO) 2454 is supplied, data of the head bit (the nth bit) is output to a delay circuit 2456 and a mixer 2451B and is also transferred to the final bit (the "1"st bit) of the shift register. The data of the "n–1"th bit of the shift register is output to a mixer 2451A and is also shifted to the "n"th bit of the shift register. The data of the "n–2"th bit, the data of the "n–3"th bit, . . . , and the data of the first bit are shifted to the left one by one, respectively.

Reference numerals 2451A and 2451B indicate the mixers to multiply the output from the RF 22 by the data of the nth bit and the data of the (n–1)th bit of the demodulation code generator 2455; 2452A and 2452B envelope detectors to envelope detect outputs of the mixers 2451A and 2451B; 2453 a subtraction amplifier to generate a signal of a voltage according to the difference between outputs of the envelope detectors 2452A and 2452B; 2454 the VCO to oscillate at a frequency according to an output voltage of the subtraction amplifier 2453.

The output voltages of the mixers 2451A and 2451B rise when a code sync is obtained in a manner similar to the mixer 2431 in FIG. 3. Since the codes which are input to the mixers 2451A and 2451B are deviated by an amount of one bit, the peak of the output of the mixer 2451A and the peak of the output of the mixer 2451B are deviated by one bit clock of the spreading code from the spreading code generator 13 on the transmission side. Therefore, the VCO 2454 generates a clock so as to coincide the intermediate point of the peak of the output of the mixer 2451A and the peak of the output of the mixer 2451B.

Therefore, the clock is delayed by ½ of one bit clock by the delay circuit 2456, thereby enabling a demodulation code synchronized with the spreading code from the spreading code generator on the transmission side to be formed.

Figure 5:
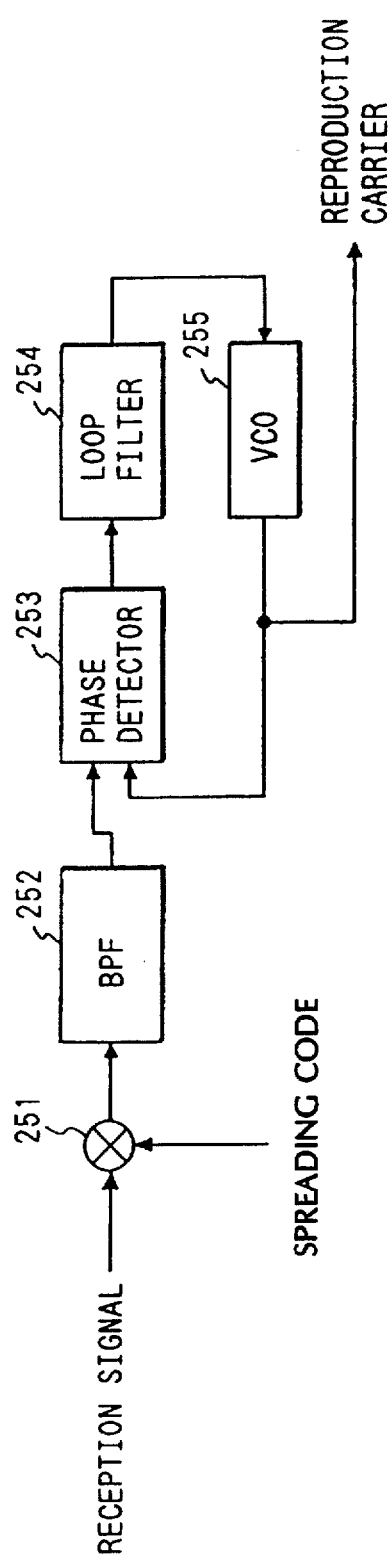
FIG. 5 is a constructional diagram of a carrier reproduction circuit using a phase locked loop.

FIG. 5 shows a construction of the carrier reproduction circuit 25 using a phase locked loop.

In the carrier reproduction circuit 25, a reception signal which was converted to a transmission frequency band or an intermediate frequency band as an output of the RF 22 is de-spread by the above spreading code, thereby reproducing a carrier of the transmission frequency band or the intermediate frequency band.

In FIG. 5, the reception signal is multiplied by the demodulation spreading code generated from the code generator 24 by a multiplier 251. After the synchronization was established, the spreading code from the spreading code generator 13 in the reception signal coincides with a clock and a code phase of the spreading code from the code generator 24. The reception signal from the RF 22 is de-spread by the multiplier 251 and a component of the carrier appears in the output. The output is subsequently input to a band pass filter 252 as necessary and only a carrier component is extracted and output.

The output from the band pass filter 252 is input to a phase locked loop which is constructed by a phase detector 253 and a voltage controlled oscillator (VCO) 255 and a signal whose phase is locked with the carrier component and which is output from the band pass filter 252 is generated from the VCO 255 as a reproduction carrier. The reproduced carrier is input to the baseband demodulation circuit 26.

In the baseband demodulation circuit 26, a baseband signal is formed from the reproduction carrier and the output of the RF 22. Subsequently, the data demodulation is executed to the baseband signal.

Figure 6:
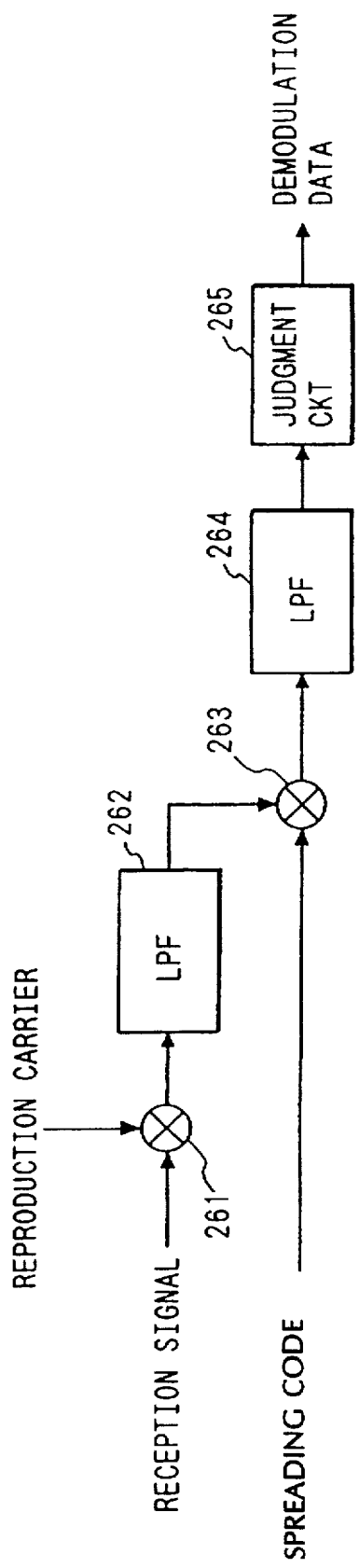
FIG. 6 is a block diagram showing a baseband demodulation circuit.

The baseband demodulation circuit 26 is constructed, for example, as shown in FIG. 6. In FIG. 6, the input reception signal is multiplied to the reproduction carrier by a multiplier 261. By eliminating an unnecessary signal by a low pass filter 262 as necessary, the reception signal is converted to a baseband signal.

The baseband signal is multiplied to a spreading code as an output of the spreading code generator 24 by a multiplier 263 and by filtering the multiplied signal by a low pass filter 264 as necessary, a correlation detection is executed. The baseband reception diffusion signal is de-spread.

By executing a data judgement by a judgement circuit 265, demodulation data is obtained.

When there is no problem on reliability, one or both of the LPFs 262 and 264 can be omitted.

Figure 7:
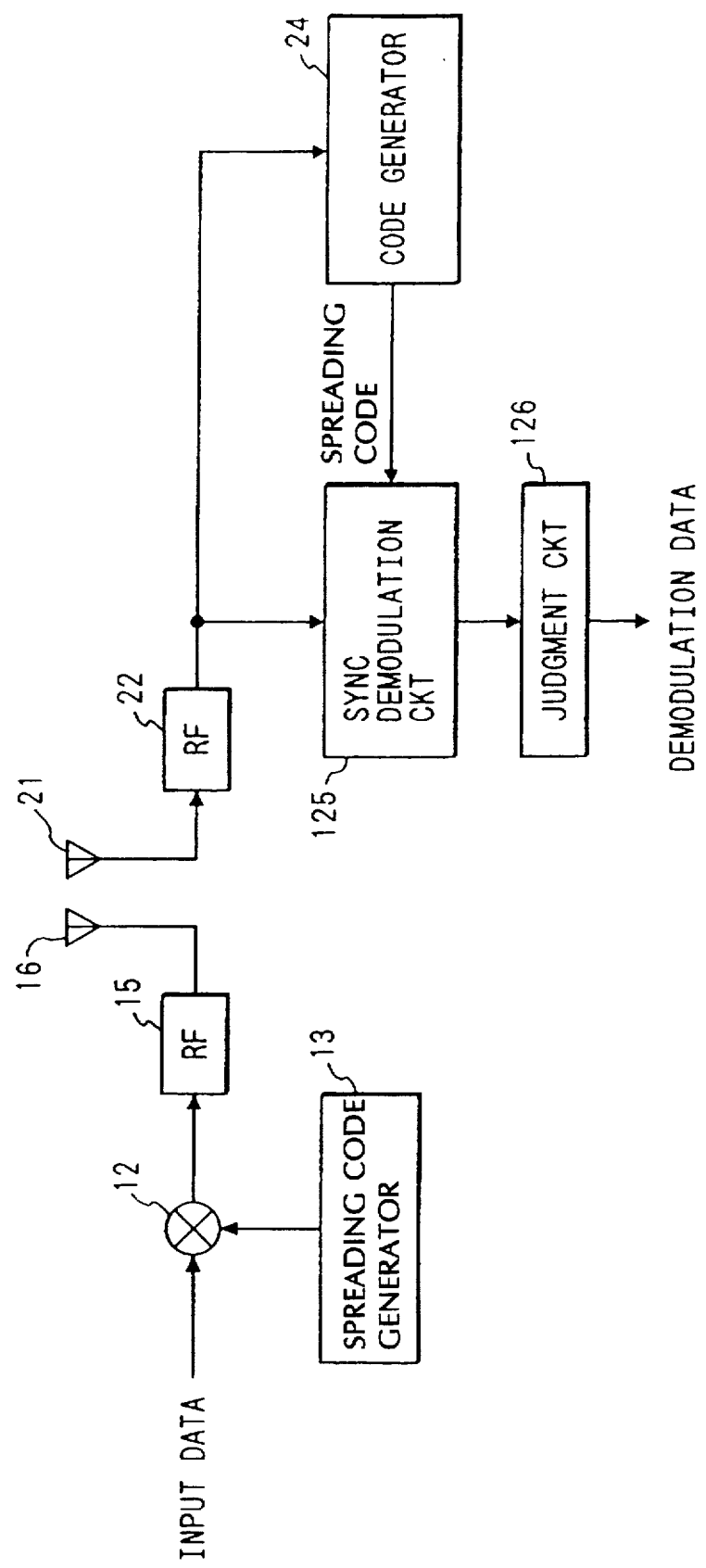
FIG. 7 is a constructional diagram of a second spread spectrum communication system embodying the invention.

FIG. 7 shows a construction of the second spread spectrum communication system embodying the invention. The same elements as those in the system of FIG. 1 are designated by the same reference numerals.

Reference numeral 125 denotes a sync demodulation circuit to obtain a baseband signal from the code generated by the code generator and the output of the RF 22. Reference numeral 126 denotes a judgment circuit to obtain demodulation data by executing a data judgment.

Figure 8:
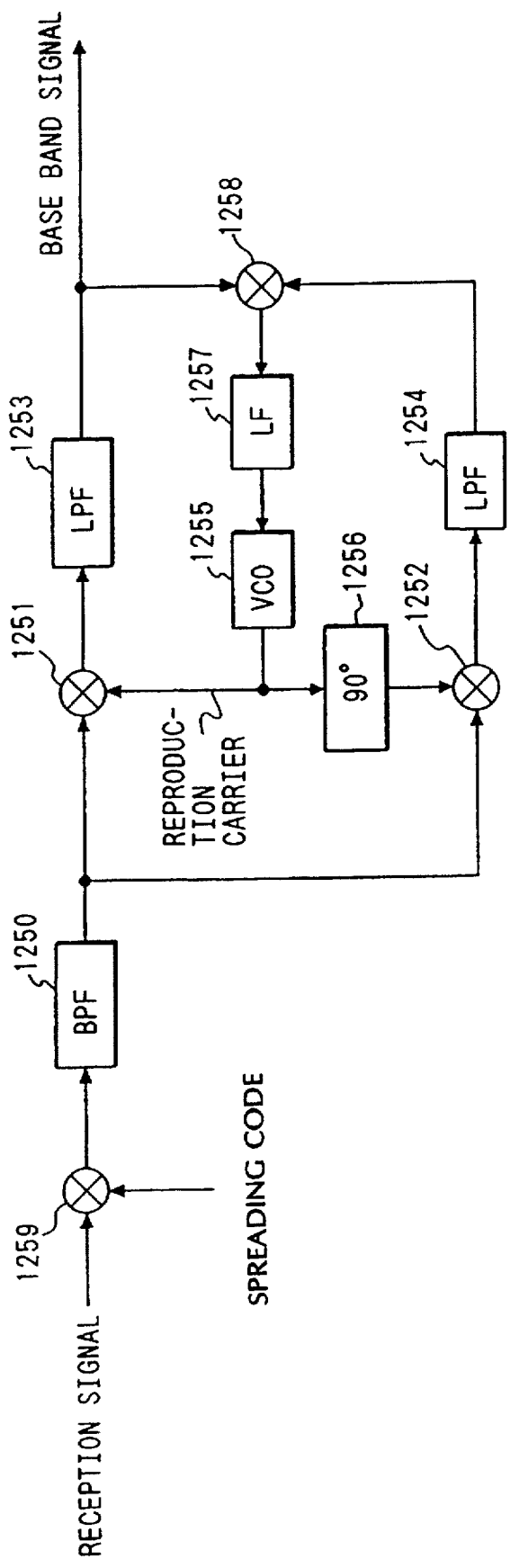
FIG. 8 is a constructional diagram of a sync demodulation circuit using a Costas loop.

FIG. 8 shows a construction of the sync demodulation circuit 125 using a Costas loop.

In FIG. 8, the output from the RF 22 is multiplied to the demodulation spreading code generated from the code generator 24 by a multiplier 1259, and is diffused. An output of the multiplier 1259 is input to a band pass filter 1250 as necessary and an unnecessary component is eliminated.

In FIG. 8, the output signal from the BPF 1250 is divided into two signals and they are output to mixers 1251 and 1252, respectively. An output from a voltage controlled oscillator (VCO) 1255 is input to the mixer 1251. On the other hand, the output from the VCO 1255 is input to the mixer 1252 through a 90° phase shifter 1256.

An in-phase component (Ich) of the input signal is output from the mixer 1251 and an quadrature component (Qch) is output from the mixer 1252. Each of the output signals is input to a low pass filter 1253 or 1254 as necessary and outputs of the LPFs are input to a mixer 1258. An output of the mixer 1258 is transmitted through a loop filter 1257 as necessary and is fed back to the VCO 1255.

By the above construction, a carrier of the input signal is reproduced by the VCO 1255 and a baseband signal is output from the mixer 1251.

Such a baseband signal which is output from the sync demodulation circuit 125 is data demodulated by the judgment circuit 126.

Figure 9:
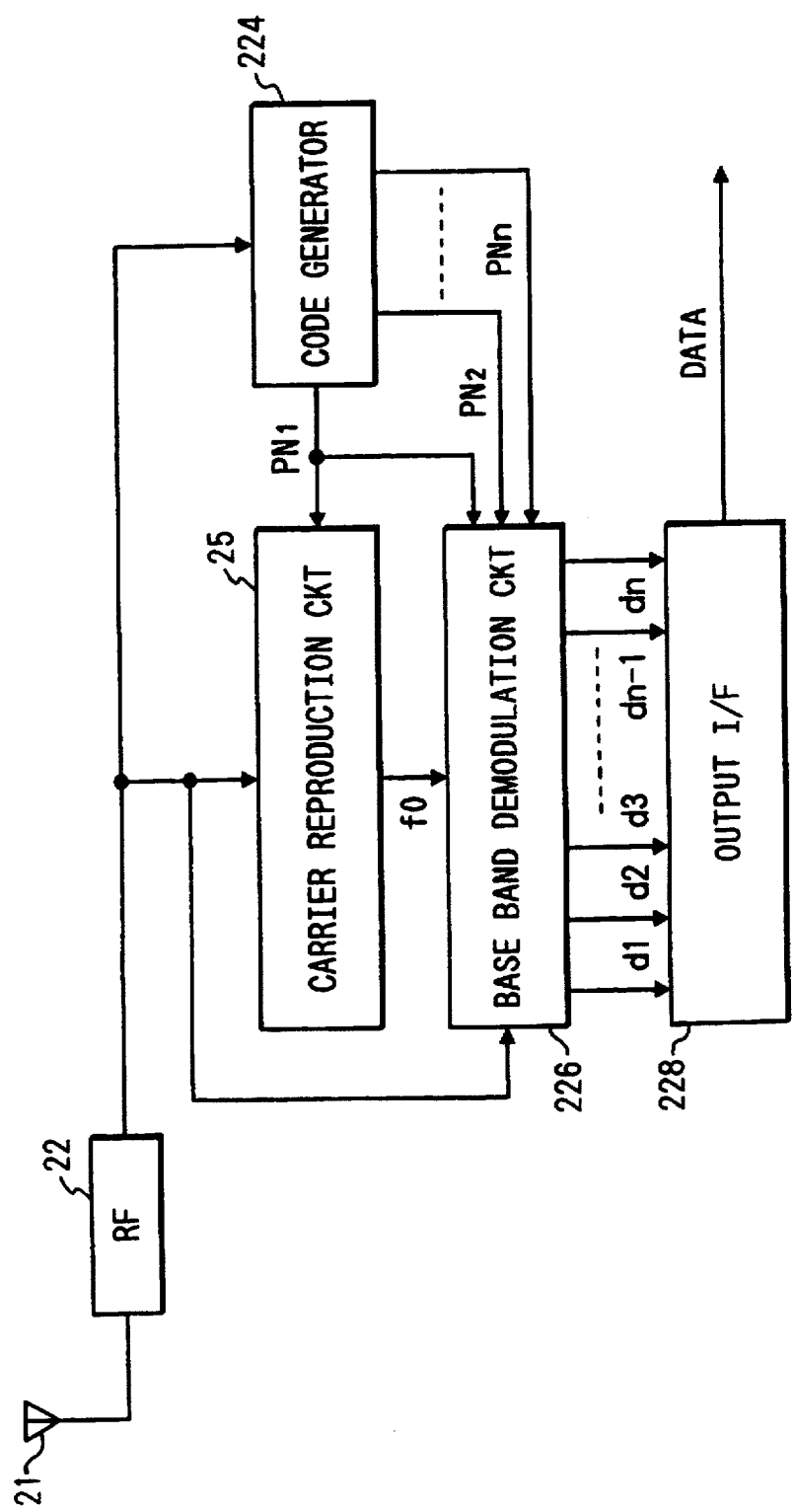
FIG. 9 is a constructional diagram of a receiving apparatus in a third spread spectrum communication system embodying the invention.

FIG. 9 shows a construction of a receiving apparatus in the third spread spectrum communication system embodying the invention.

In the system, data of (n) bits is communicated in parallel by (n) sets of spreading codes.

Figure 15:
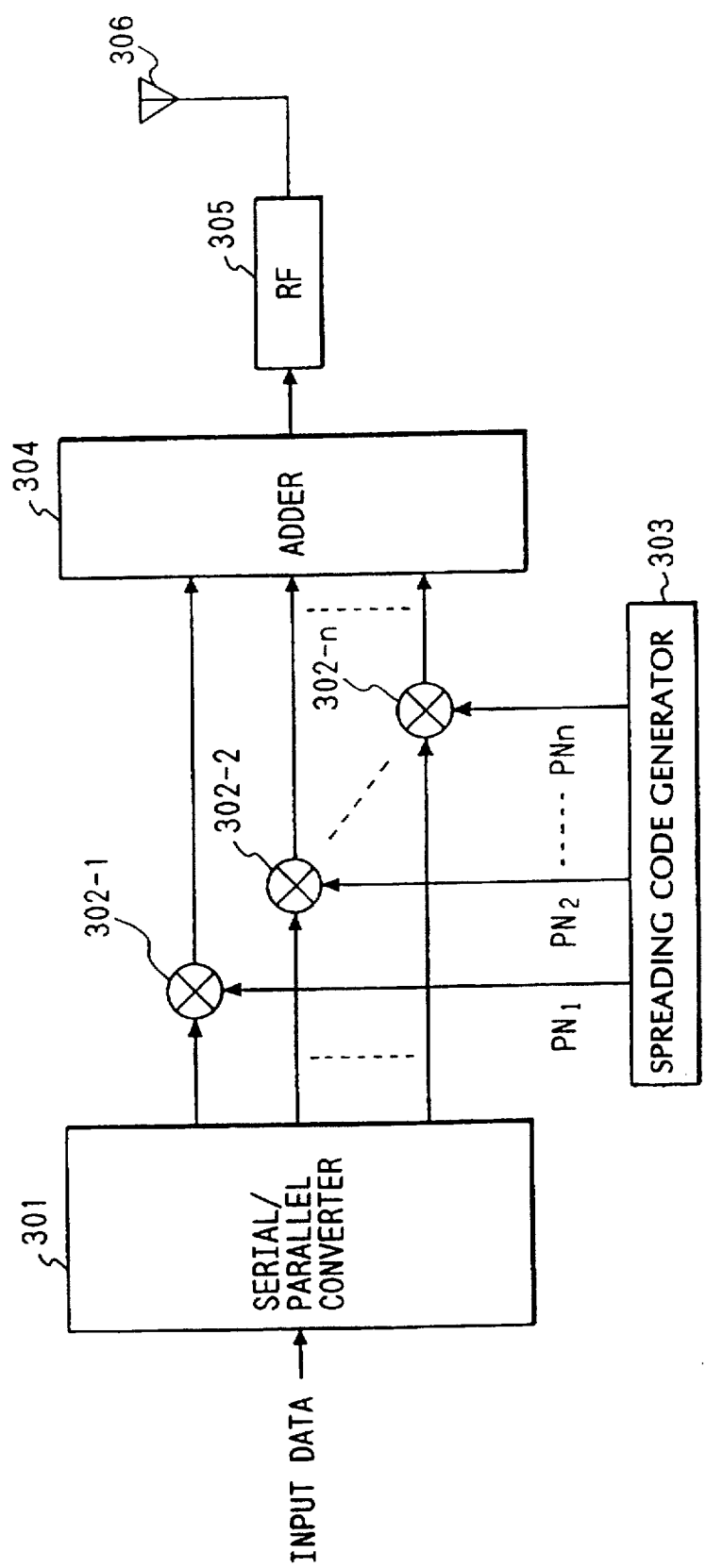
FIG. 15 is a constructional diagram of a transmitting apparatus of a conventional spread spectrum communication system which executes a code division multiplex communication.
Figure 16:
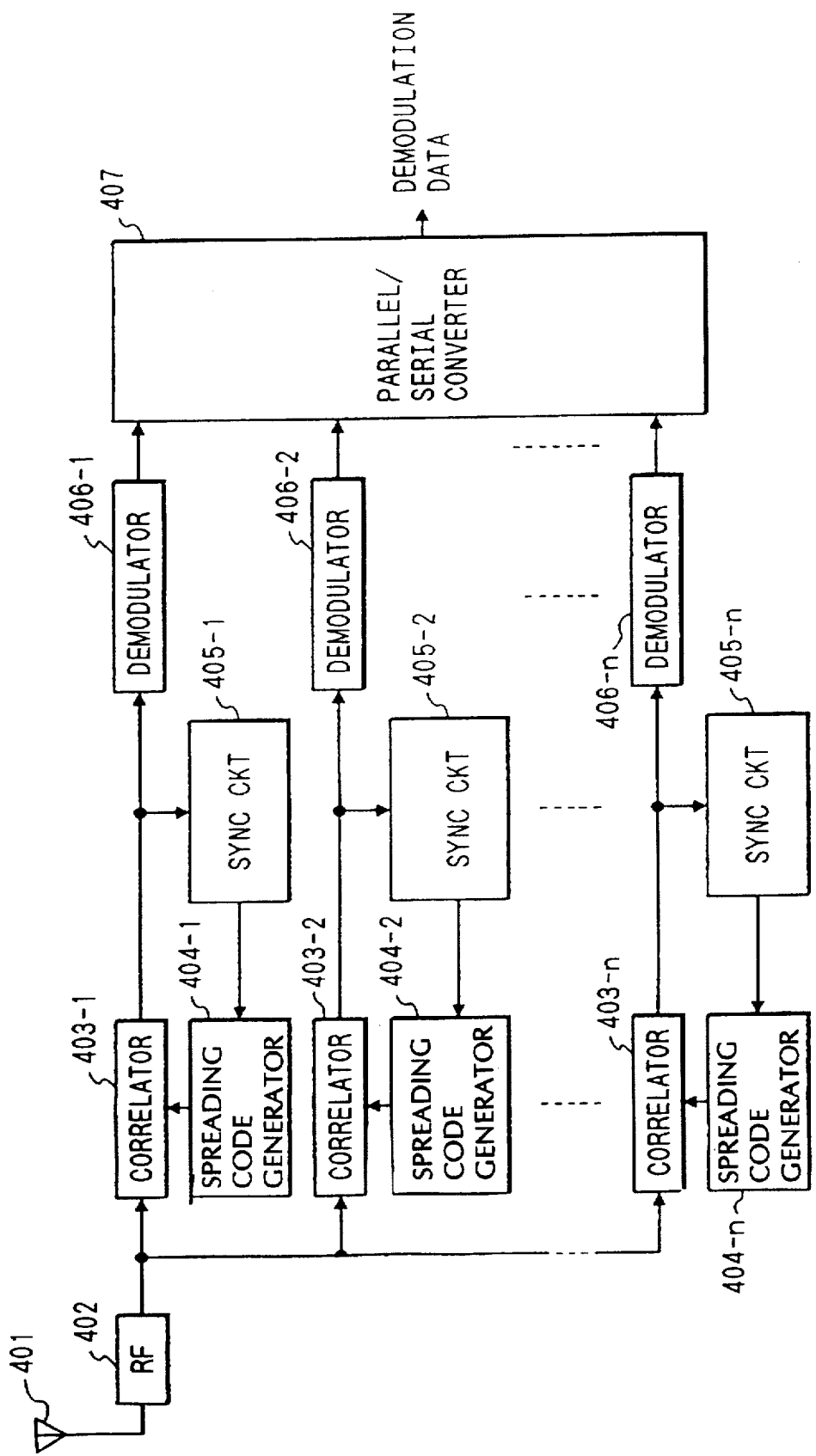
FIG. 16 is a constructional diagram of a receiving apparatus of the conventional spread spectrum communication system which executes a code division multiplex communication.

It is now assumed that a construction of the transmitter is common to that of the conventional example shown in FIG. 15.

The apparatus of the embodiment comprises: the reception antenna 21; the RF 22 which has a low noise amplifier and a band pass filter and the like and comprises a local oscillator, a frequency converter, and the like to convert a reception signal into an intermediate frequency band as necessary; the carrier reproduction circuit 25 to reproduce a carrier from the reception signal; a spreading code generator 224 to generate a plurality of spreading codes $PN_1, PN_2, \ldots, PN_n$ which are code or clock synchronized with the spreading codes on the transmission side by using, for example, a sliding correlator, a matched filter, a convolver, or the like; a baseband demodulation circuit 226 to extract a baseband signal from the reception carrier by using the reproduced carrier signal and the spreading codes each of which is synchronized with the reception signal; and an output interface 228 to convert the demodulated parallel data to serial data as necessary.

In the above construction, the code generator 224 generates the spreading code $PN_1$ which is synchronized with the spreading code $PN_1$ included in the reception signal in a manner similar to the construction in FIGS. 2, 3, and 4. The spreading codes $PN_2, \ldots, PN_n$ are synchronized with the $PN_1$ and are generated. In a manner similar to the construction in FIG. 5, the carrier reproduction circuit 25 executes a carrier reproduction.

By using the reproduced carrier signal $f_0$, a reception IF signal is directly converted to a baseband signal in the baseband demodulation circuit 226. By using the synchronized spreading codes $PN_1, \ldots, PN_n$, a baseband demodulation is executed.

Figure 10:
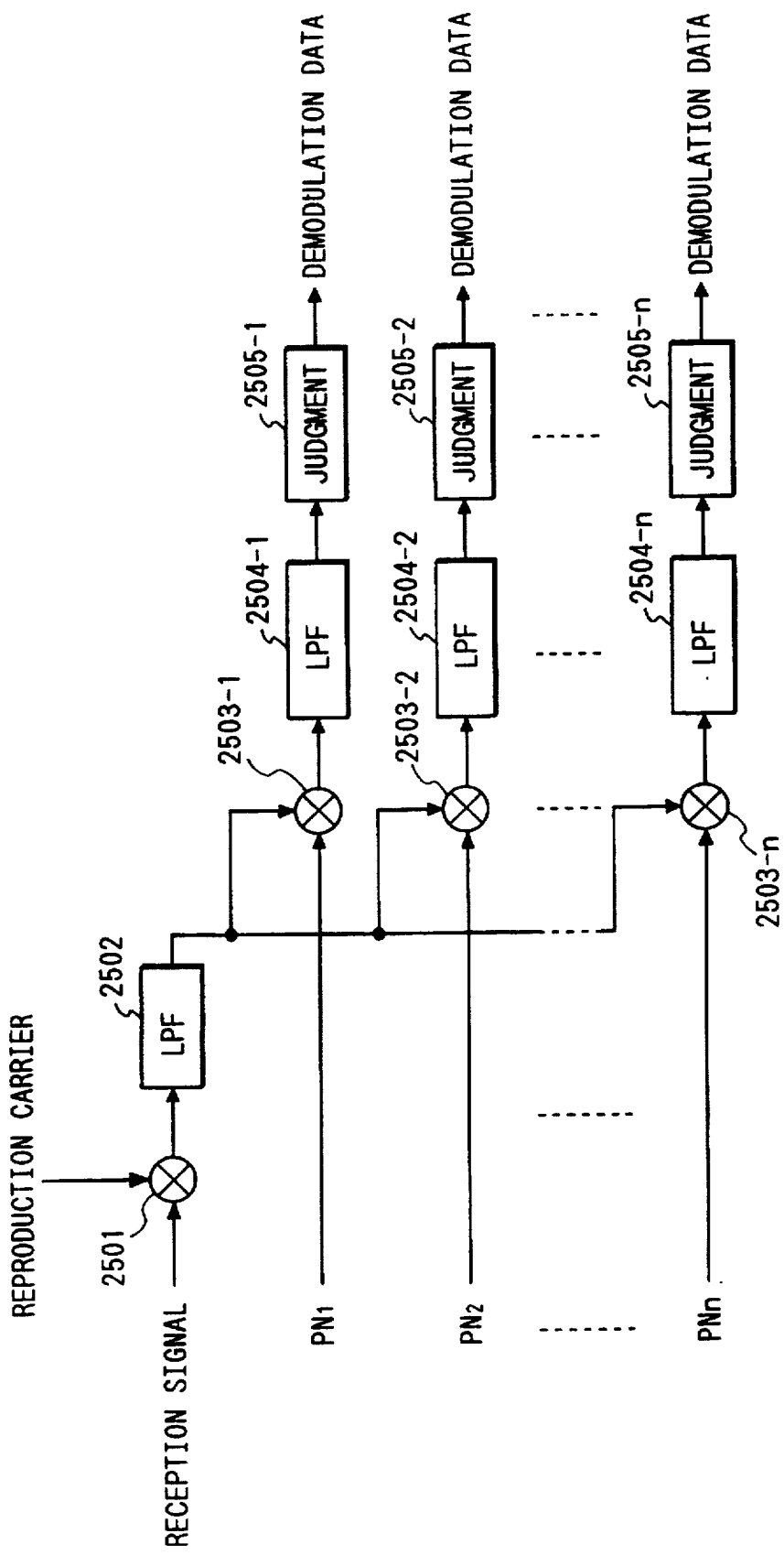
FIG. 10 is a constructional diagram of a baseband demodulation circuit.

FIG. 10 is a block diagram showing a detailed construction of the baseband demodulation circuit 226 of the embodiment.

In FIG. 10, the input reception signal is multiplied to the reproduction carrier by a multiplier 2501. By eliminating an unnecessary signal by a low pass filter 2502 as necessary, the reception signal is converted to a baseband signal.

The baseband signal is distributed to (n) branches. In the branches, the distributed signals are multiplied to the group of spreading codes $PN_1$ to $PN_n$ as outputs of the spreading code generator 224 by multipliers 2503-1 to 2503-n, respectively. Further, as necessary, by filtering those signals by a group of low pass filters 2504-1 to 2504-n, a correlation detection is executed in each of the code division channels, thereby de-spreading the baseband reception diffusion signals.

The above signals are subjected to the data judgment by the group of judgment units 2505-1 to 2505-n, so that (n) parallel demodulation data are obtained. Those (n) parallel demodulated data are converted into the serial data and output by the output interface 228 as necessary.

One or both of the low pass filters 2502 and 2504 can be also omitted so long as there is no problem on reliability.

Figure 11:
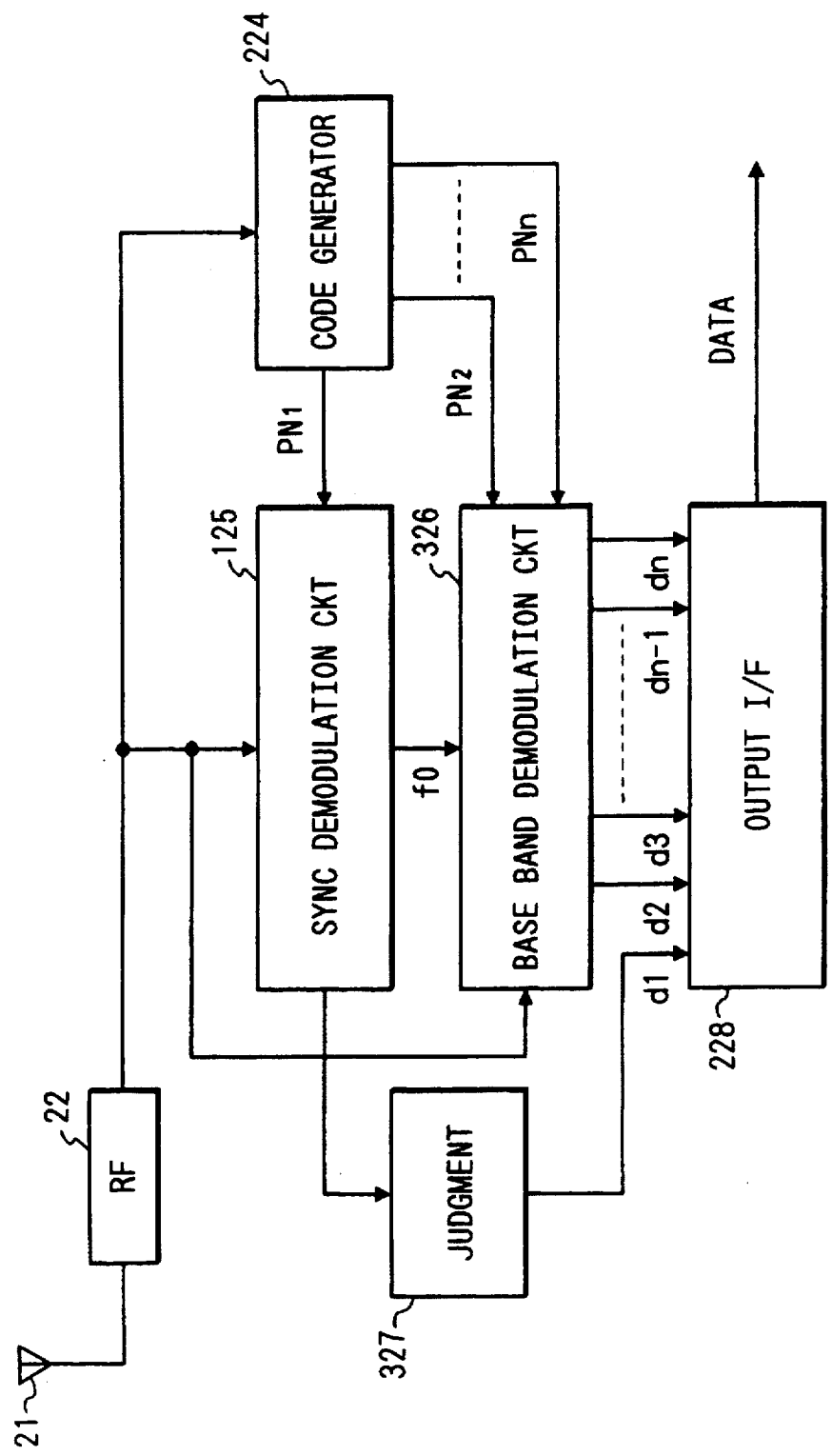
FIG. 11 is a constructional diagram of a receiving apparatus in a fourth spread spectrum communication system embodying the invention.

FIG. 11 shows a construction of a receiving apparatus in the fourth spread spectrum communication system which embodies the invention.

Although the carrier reproducing circuit as shown in FIG. 5 has been used in the apparatus of FIG. 9, in place of it, a sync demodulation circuit 125 shown in FIG. 8 is used in the embodiment.

In FIG. 11, the same component elements as those in FIG. 9 are designated by the same reference numerals.

In FIG. 11, although a construction of a baseband demodulation circuit 326 is almost similar to that of the circuit shown in FIG. 10, since a judgment regarding a code $PN_1$ is executed by a judgment unit 327, the multiplier 2503-1, LPF 254-1, and judgment unit 2505-1 are unnecessary. An output signal from the radio frequency process unit (RF) 22 and an output signal of the VCO 1255 in FIG. 8 are input to the multiplier 2501. The judgment unit 327 judges the demodulation data on the basis of an output of the mixer 1251 in FIG. 8.

Figure 12:
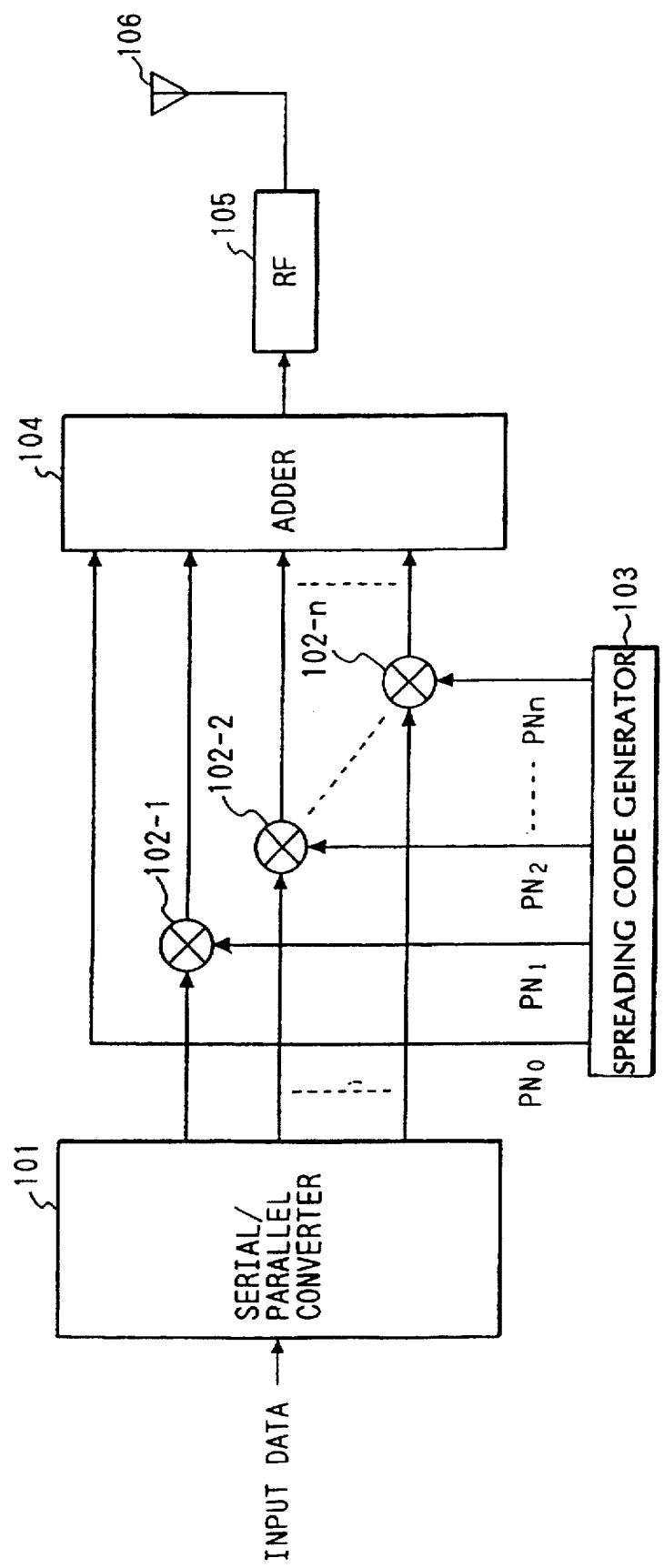
FIG. 12 is a constructional diagram of a transmitting apparatus in a fifth spread spectrum communication system embodying the invention.
Figure 13:
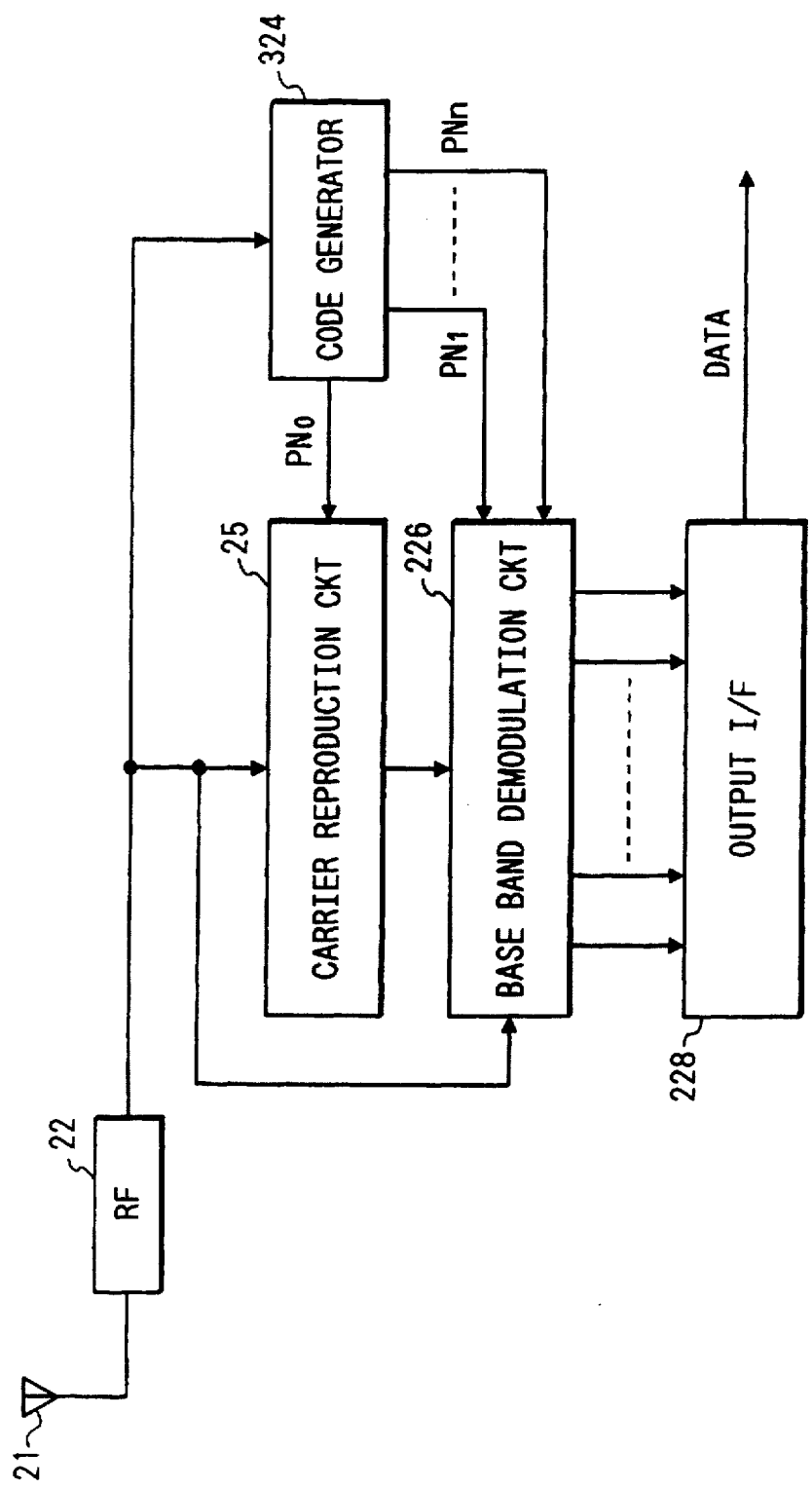
FIG. 13 is a constructional diagram of a receiving apparatus in the fifth spread spectrum communication system embodying the invention.

FIGS. 12 and 13 show constructions of a transmitting apparatus and a receiving apparatus in the fifth spread spectrum communication system embodying the invention.

In the embodiment, a spreading code $PN_0$ which is used only for synchronization is provided.

In FIG. 12, a serial/parallel converter 101 converts the data which is serially input into (n) parallel data. A group of multipliers 102-1 to 102-n multiply the respective parallel data and (n) spreading codes which are generated from a spreading code generator 103.

The spreading code generator 103 generates (n) different spreading codes $PN_1$ to $PN_n$ and the spreading code $PN_0$ which is used only for synchronization. An adder 104 adds the spreading code only for synchronization which is generated from the generator 103 and (n) outputs of the group of multipliers 102-1 to 102-n.

An RF 105 converts an output of the adder 104 into a transmission frequency signal. A signal from the RF 105 is transmitted from a transmission antenna 106.

In FIG. 13, component elements which are common to those in FIG. 9 are designated by the same reference numerals. A code generator 324 generates the same codes $PN_0$ to $PN_n$ as the spreading codes $PN_0$ to $PN_n$ from the spreading code generator 103 on the transmission side. Although the carrier reproduction circuit 25 shown in FIG. 5 has been used in FIG. 13, the sync demodulation circuit 125 shown in FIG. 8 can be also used. However, since the baseband signal which is output from the mixer 1251 of the sync demodulation circuit 125 corresponds to the channel which is used only for synchronization, the judgment of the demodulation data is not executed.

Figure 14:
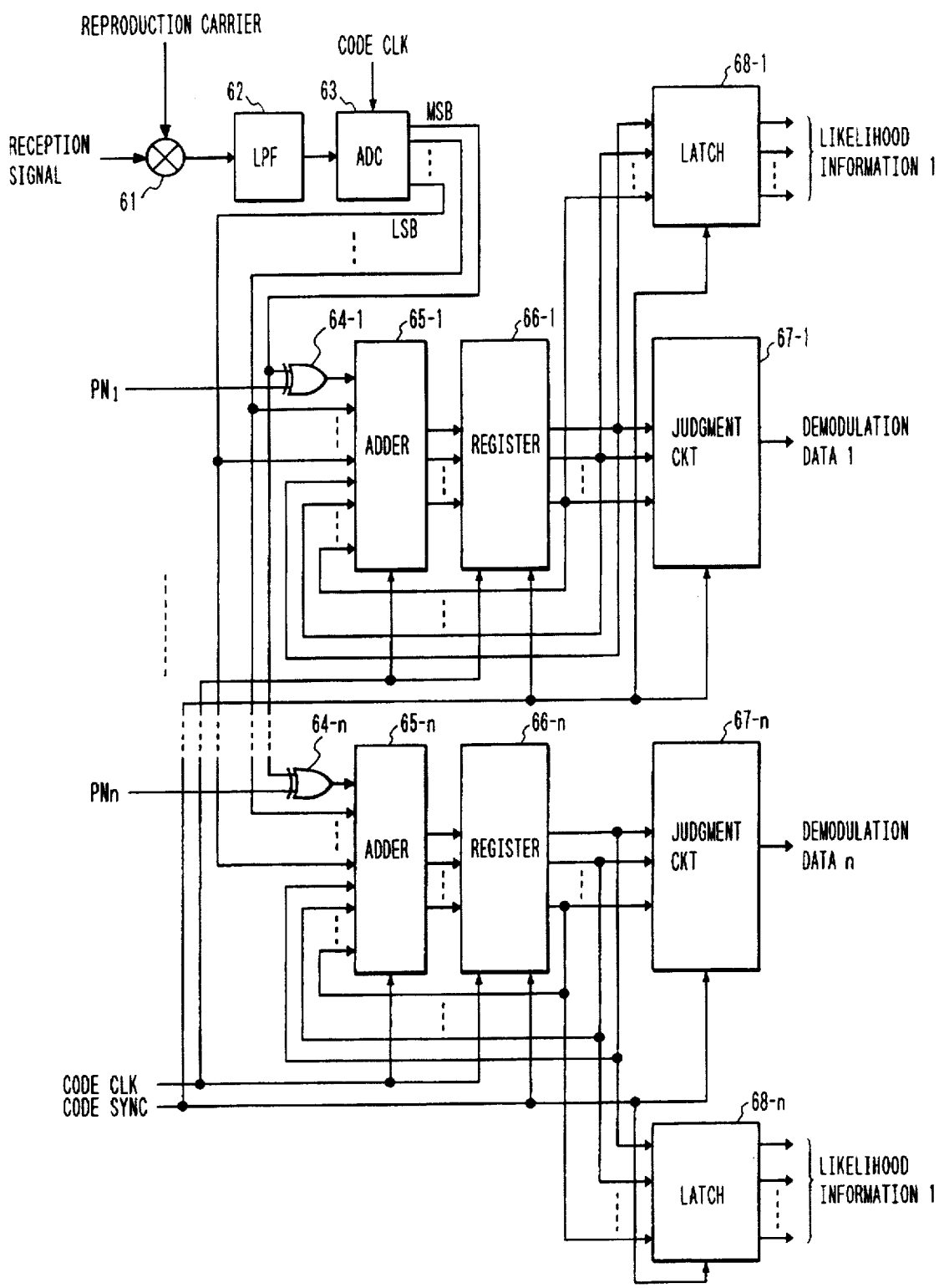
FIG. 14 is a constructional diagram of a modification of the base band demodulation circuit in FIG. 10.

FIG. 14 shows a modification of the baseband demodulation circuit shown in FIG. 10.

In the baseband demodulation circuit in FIG. 14, a code sync signal indicative of the code start of the spreading code only for synchronization and a clock signal of the code are input. A correlation is calculated by the group of spreading codes $PN_1$ to $PN_n$, code sync signal, and clock signal.

In FIG. 14, the input reception signal and the reproduction carrier are multiplied by a multiplier 61. An unnecessary signal is eliminated by a low pass filter 62. Thus, the reception signal is converted into the baseband signal. The baseband signal is converted into the digital signal having a resolution of a single bit or a plurality of bits by an A/D converter 63 using a code clock as a sampling period.

The digital signal is distributed to (n) branches. In each branch, the exclusive OR of the most significant bit MSB of the digital signal and each of the group of spreading codes $PN_1$ to $PN_n$ as outputs of the spreading code generator is calculated by each of exclusive OR circuits 64-1 to 64-n. The calculated OR are input to a group of adders 65-1 to 65-n together with the other bits.

The adders 65-1 to 65-n add the input signals and outputs of a group of registers 66-1 to 66-n every code clock pulse. The addition results are output to the registers 66-1 to 66-n.

The registers 66-1 to 66-n have been reset at a time point when the head bit of each spreading code is input. After that, the result in which the product of the reception signal and the spreading code was added is stored for one period of the spreading code.

Therefore, at a time point when the last bit in one period of the spreading code is input, the correlation value of one period of each spreading code and the reception signal is stored in the registers 66-1 to 66-n. The correlation values are subjected to the data judgment by a group of subsequent judgment circuits 67-1 to 67-n, so that (n) demodulation data are derived. The (n) demodulated parallel data are converted into the serial data by the output interface 228 and output. By this method, the baseband demodulation circuit can be constructed by a digital circuit and an integration degree can be raised.

At a time point when the last bit of one period of the spreading code is input, the outputs of the registers 66-1 to 66-n are latched by a group of latches 68-1 to 68-n and output as likelihood information indicative of the reliability of the demodulation data. The (n) demodulated parallel data are converted into the serial data by the output interface 228 and output.

Since the digital signal processes are used for correlation and demodulation as mentioned above, the likelihood information having a resolution that is proportional to a spreading code length can be directly obtained from an output of the digital correlator. The reliability of the demodulation data can be raised without adding a complicated circuit.

Even in the baseband demodulation circuit in FIG. 6, it can be modified so as to obtain the likelihood information in a manner similar to FIG. 14.

Although the above third to fifth spread spectrum communication system has been described with respect to the case of the binary modulation, the invention can also use an orthogonal modulation. Other various kinds of modifications can be also possible within the scope of claims of the invention.

Figure 17:
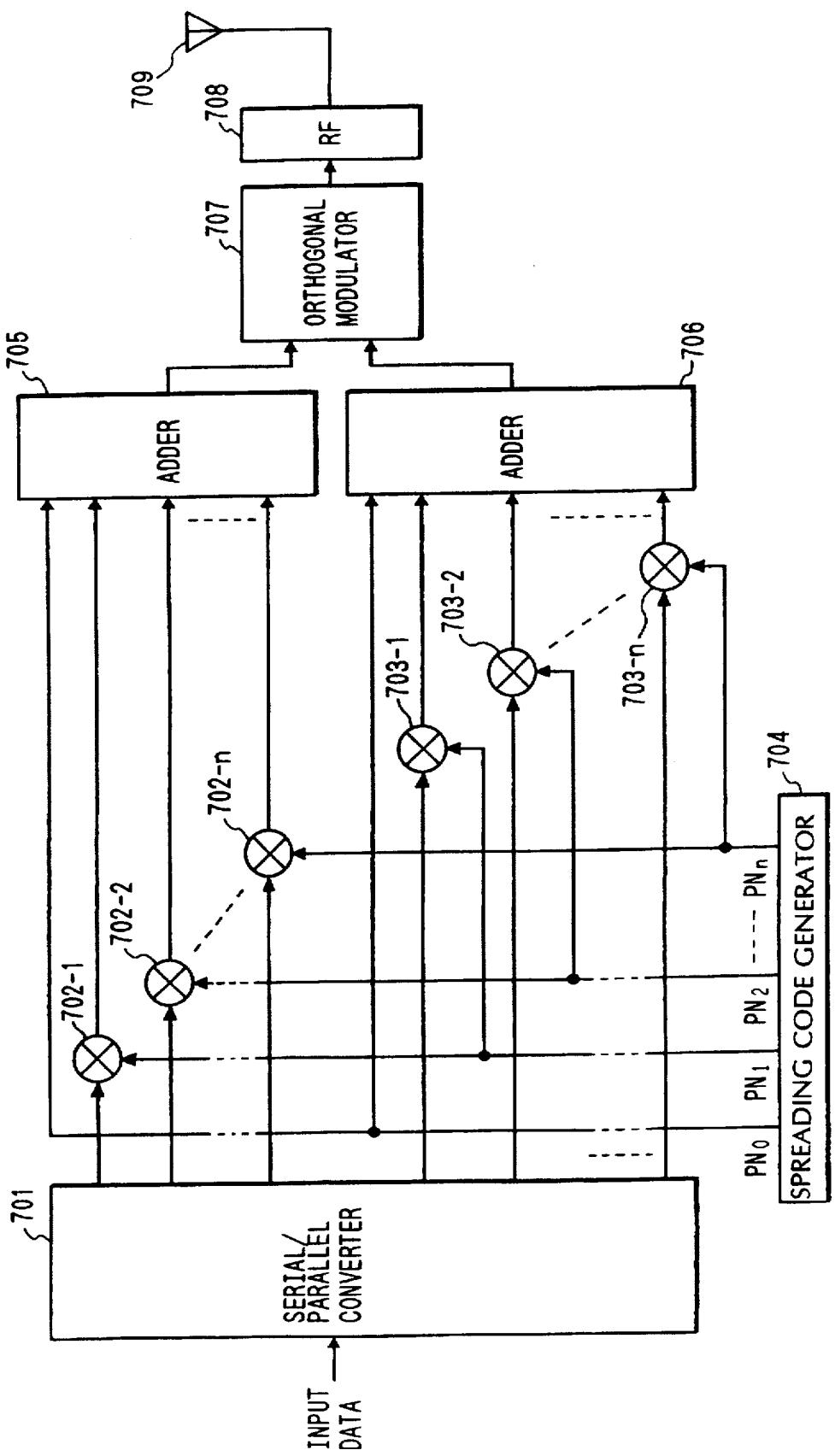
FIG. 17 is a constructional diagram of a transmitting apparatus in a sixth spread spectrum communication system embodying the invention.

FIG. 17 shows a construction of a transmitting apparatus in the sixth spread spectrum communication system embodying the invention.

In FIG. 17, a serial/parallel converter 701 converts serial input data into 2n parallel data. A group of multipliers 702-1 to 702-n multiply the (n) data among the 2n parallel data and (n) spreading codes which are generated from a spreading code generator 704, respectively.

A group of multipliers 703-1 to 703-n multiply the remaining (n) data among the 2n parallel data and the (n) spreading codes which are generated from the generator 704, respectively.

The spreading code generator 704 generates (n) different spreading codes and a spreading code which is used only for synchronization. An adder 705 adds the spreading code only for synchronization which is generated from the generator 704 and (n) outputs of the group of multipliers 702-1 to 702-n.

An adder 706 adds the spreading code only for synchronization which is generated from the generator 704 and the (n) outputs of the multipliers 703-1 to 703-n.

An orthogonal modulator 707 receives outputs of the two adders 705 and 706 as inputs of an in-phase (I) channel and an orthogonal (Q) channel. An RF 708 converts an output of the orthogonal modulator 707 into a transmission frequency signal. A signal from the RF 708 is transmitted from a transmission antenna 709.

In the above construction, the input data is converted into the 2n parallel data of the number that is twice as large as the number of code division multiplexing times by the serial/parallel converter 701.

On the other hand, the spreading code generator 704 generates (n+1) different spreading codes $PN_0$ to $PN_n$ of the same code period.

The spreading code $PN_0$ among them is used only for synchronization and carrier reproduction and is not modulated by the above parallel data but is directly input to the adders 705 and 706. The remaining (n) spreading codes are modulated by the 2n parallel data by the multipliers 702-1 to 702-n and the multipliers 703-1 to 703-n. Outputs of the multipliers 702-1 to 702-n are input to the adder 705. The outputs of the multipliers 703-1 to 703-n are input to the adder 706. The adders 705 and 706 linearly add the input (n+1) signals, respectively, and supply the baseband signals as outputs to I and Q channels of the orthogonal modulator 707.

The orthogonal modulator 707 multiplies the input signals of the I and Q channels with carriers whose phases are deviated by 90°. Both of the multiplication results are added and the addition signal is output. This output signal is converted into a high frequency signal having a proper center frequency by the RF 708 and is transmitted from the transmission antenna 709.

Since a construction of the reception side is almost similar to that of the fifth embodiment (FIG. 13), only portions different from the fifth embodiment will be described. A carrier reproduction circuit in the sixth embodiment has a construction shown in, for example, FIG. 18 in order to execute the orthogonal demodulation.

Figure 18:
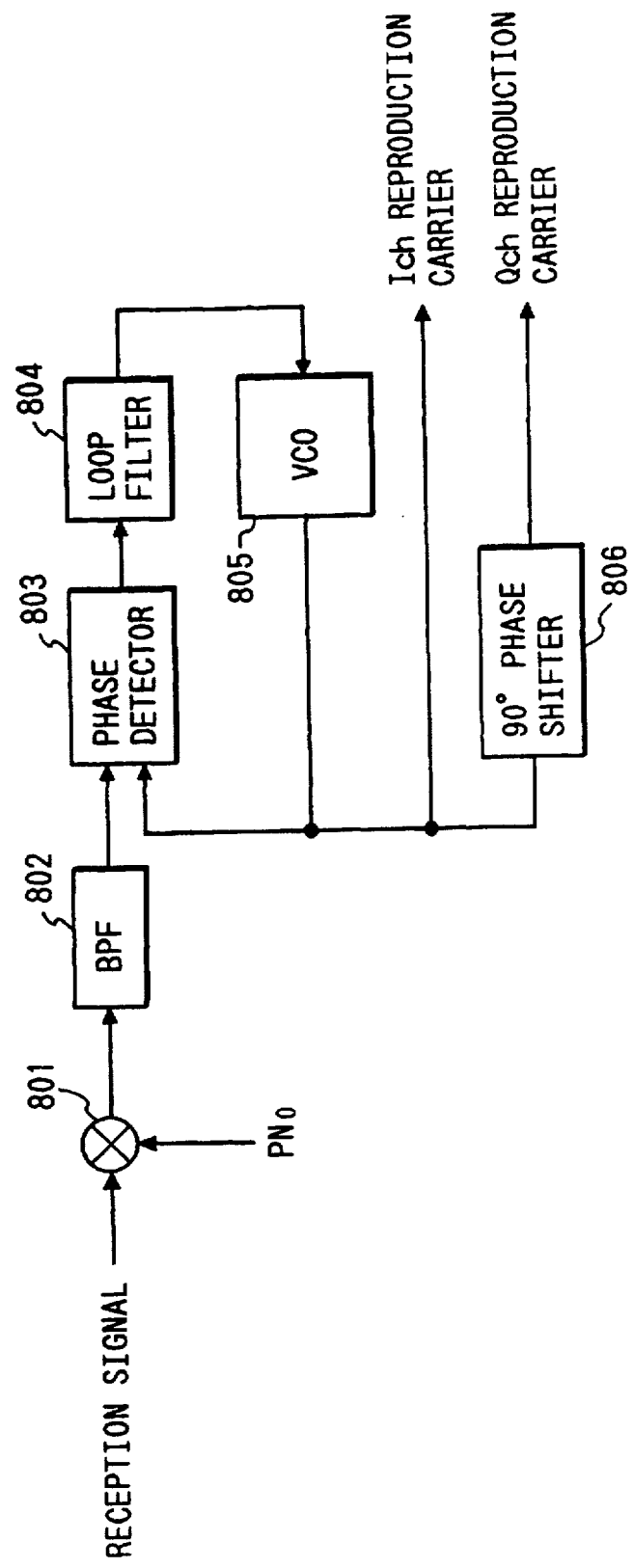
FIG. 18 is a constructional diagram of a carrier reproduction circuit in a receiving apparatus in the sixth spread spectrum communication system embodying the invention.

In FIG. 18, the reception signal is multiplied with the spreading code only for synchronization by a multiplier 801. After the synchronization was made, the clock and code phases of the spreading code only for synchronization in the reception signal coincide and the spreading code only for synchronization on the transmission side is not modulated by the data. Therefore, it is de-spread by the multiplier 801 and a carrier component appears in its output. The output signal of the multiplier 801 is subsequently input to a band pass filter (BPF) 802. Only the carrier component is taken out and output.

An output signal of the BPF 802 is subsequently input to a phase locked loop comprising a phase detector 803, a loop filter 804, and a VCO 805. The signal whose phase is locked with the carrier component which is output from the BPF 802 is output from the VCO 805 as a reproduction carrier of the I channel. Further, the phase of such an output signal is shifted by 90° by a 90° phase shifter 806, thereby obtaining a reproduction carrier of the Q channel.

Figure 19:
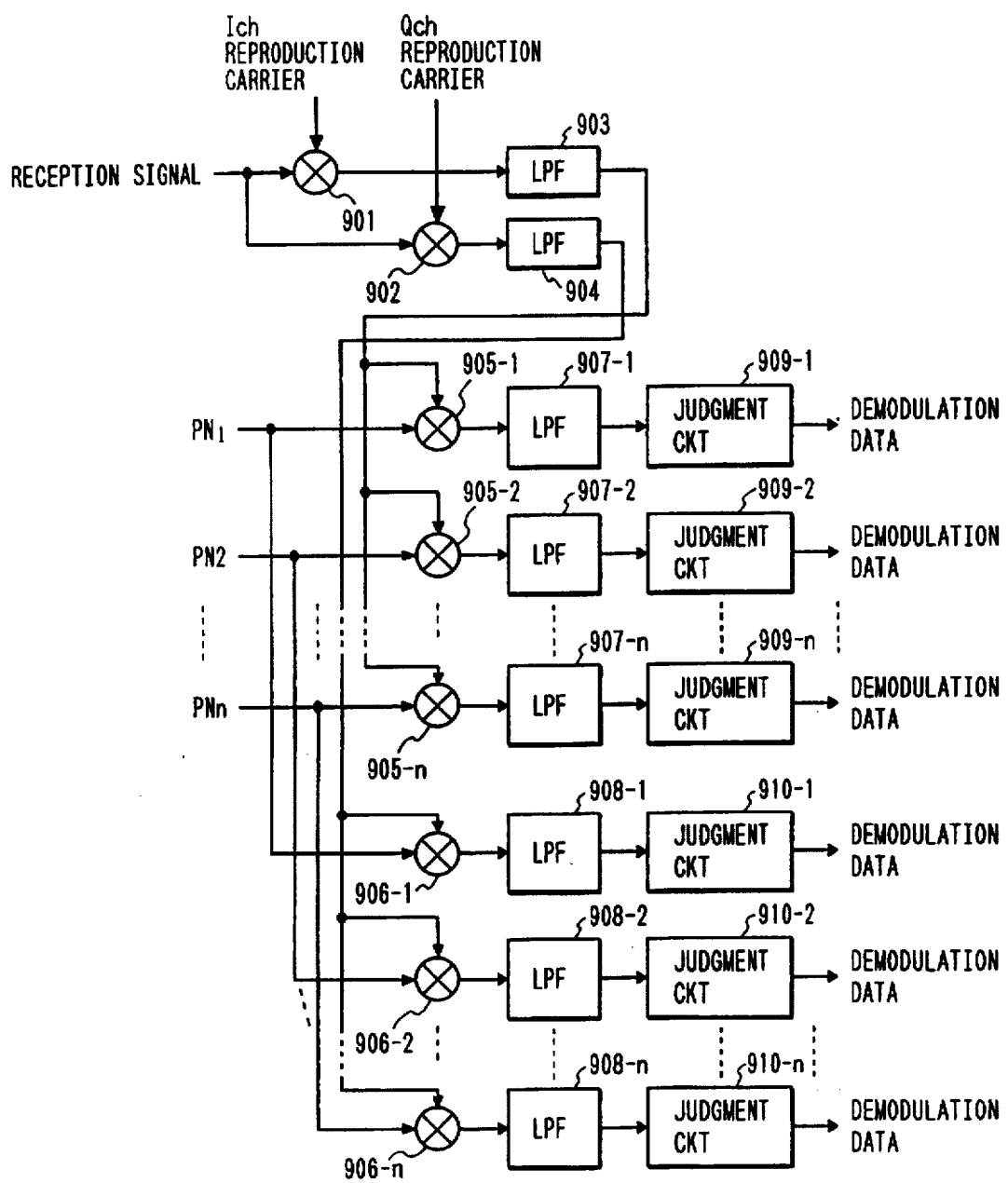
FIG. 19 is a constructional diagram of a baseband demodulation circuit in the receiving apparatus in the sixth spread spectrum communication system embodying the invention.

The baseband demodulation circuit in the sixth embodiment has a construction as shown in, for example, FIG. 19 in order to perform the orthogonal demodulation.

In FIG. 19, the input reception signal is multiplied with the I and Q channel reproduction carriers by an I channel multiplier 901 and a Q channel multiplier 902, respectively. The multiplication results pass through low pass filters (LPFs) 903 and 904, so that they are converted into baseband signals which were separated into an in-phase component and an quadrature component.

Those two baseband signals are respectively distributed into (n) branches and are multiplied with the group of spreading codes $PN_1$ to $PN_n$ as outputs of the spreading code generator 704 in each branch by multipliers 905-1 to 905-n and multipliers 906-1 to 906-n, respectively. The multiplication results are filtered by a group of filters 907-1 to 907-n and a group of filters 908-1 to 908-n, thereby detecting a correlation in each code division channel. The two orthogonal baseband reception diffusion signals are de-spread.

The above signals are subjected to data judgment by a group of judgment circuits 909-1 to 909-n and a group of judgment circuits 910-1 to 910-n, so that 2n parallel demodulation data are obtained.

Figure 20:
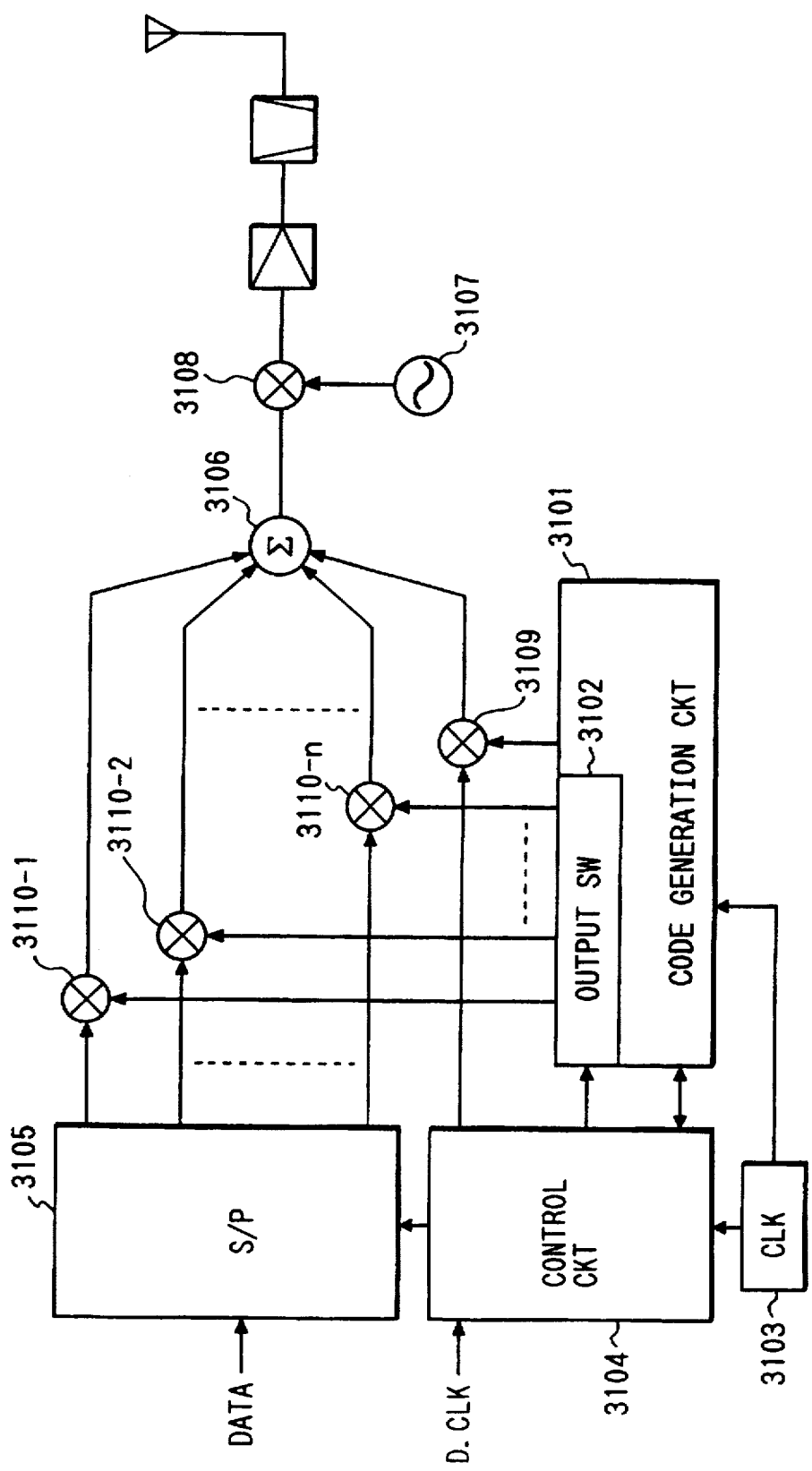
FIG. 20 is a constructional diagram of a transmitting apparatus in a seventh spread spectrum communication system embodying the invention.
Figure 21:
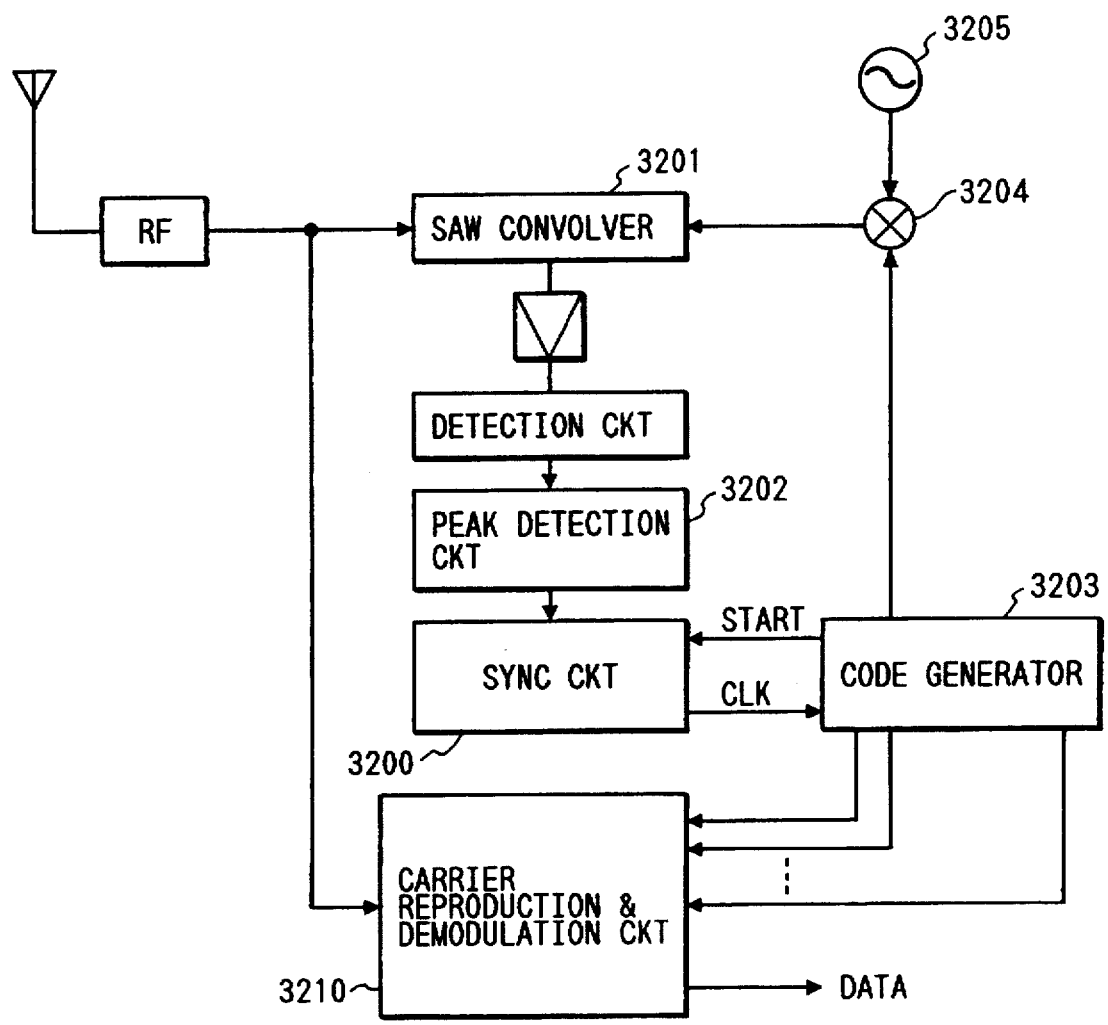
FIG. 21 is a constructional diagram of a receiving apparatus in the seventh spread spectrum communication system embodying the invention.

FIGS. 20 and 21 show constructions of a transmitting apparatus and a receiving apparatus of the seventh spread spectrum communication system embodying the present invention.

In FIG. 20, a code generation circuit 3101 generates a plurality of spreading codes. An output switch 3102 selects the spreading codes generated from the code generation circuit 3101 and outputs. A clock generator 3103 generates a transmission timing signal. A control circuit 3104 controls transmission timings of transmission code multiplex channels and data.

A serial/parallel conversion circuit 3105 is used to distribute transmission data to each channel. An addition circuit 3106 adds the signals which are obtained by modulating the spreading codes of the respective channels by the transmission data.

A transmission carrier oscillator 3107 generates a transmission carrier. A mixer 3108 modulates the carrier by the added code channel signal.

A mixer 3109 modulates a preamble pattern by the spreading code for synchronization as a spreading code channel for synchronization. Mixers 3110-1 to 3110-n modulate the transmission data by the spreading codes selected by the output switch 3102 as data communication code channels.

In the embodiment, although the sync channels have independently been provided, data communication code channels and sync channels can be also commonly used.

FIG. 21 is a block diagram showing a construction of a receiving apparatus in the seventh embodiment.

An SAW convolver 3201 is a correlator to obtain a correlation of a local reference wave signal modulated by a spreading code for reference and the reception signal. A correlator other than the SAW convolver can be also used. A mixer 3204 modulates an oscillation output of a local oscillator 3205 by the spreading code for reference from a code generation circuit 3203 and supplies to the SAW convolver 3201.

A peak detection circuit 3202 is a circuit to detect the peak of an envelope after the envelope of an output (hereinafter, referred to as a convolution output) of the SAW convolver 3201 was detected. The code generation circuit 3203 is a circuit to generate the spreading code for reference and the spreading code for demodulation (hereinafter, referred to as an de-spread code).

A sync circuit 3200 executes a acquisition operation. A carrier reproduction demodulation circuit 3210 executes a demodulating operation of the reception signal by using a de-spread code for demodulation. The demodulation circuit 3210 has a construction similar to the carrier reproduction circuit 25 and baseband demodulation circuit 226 in FIG. 13.

Figure 22:
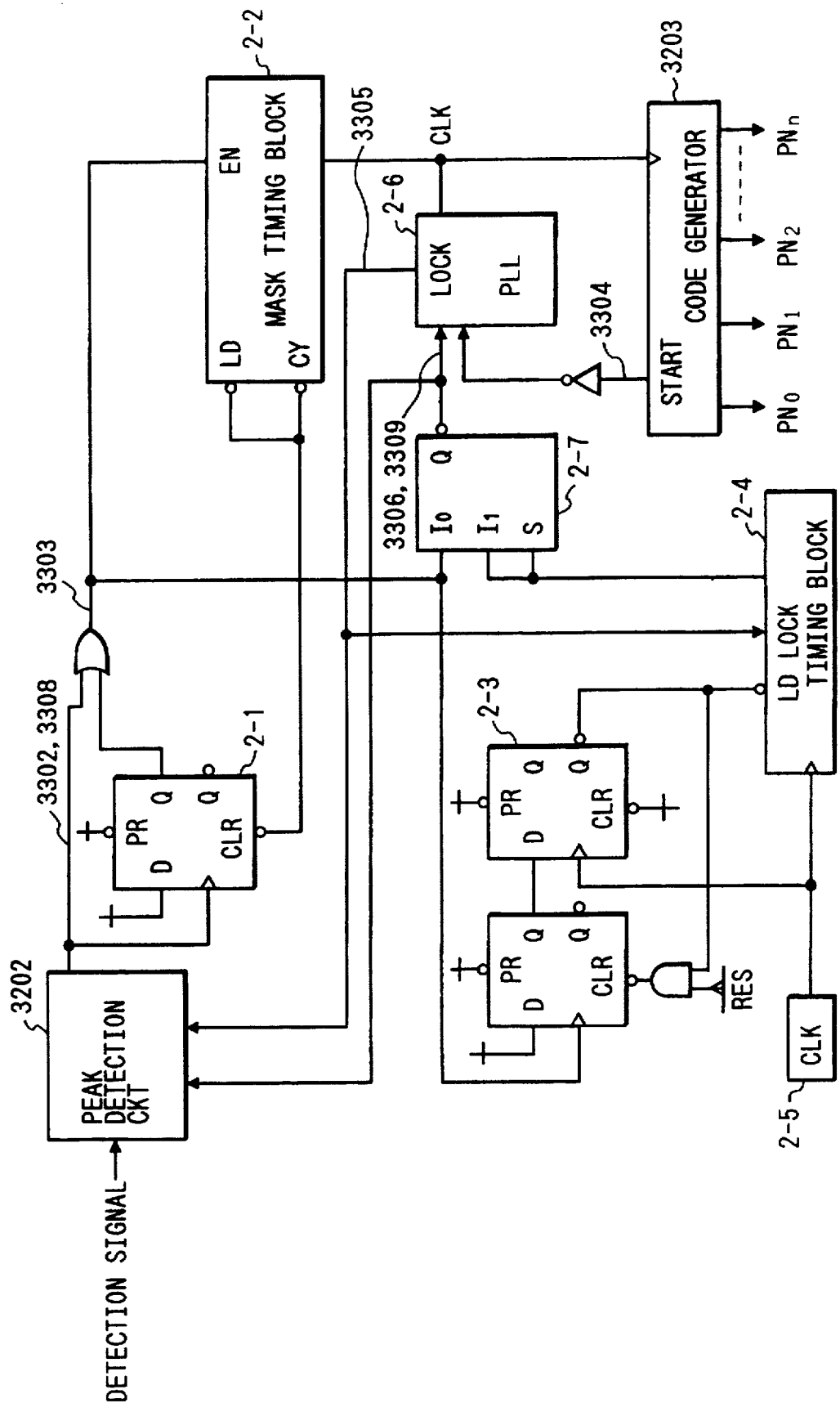
FIG. 22 is a constructional diagram of a sync circuit.

FIG. 22 is a block diagram showing an internal construction of the sync circuit 3200.

A flip-flop (F/F) 2-1 latches the peak information obtained by the peak detecting circuit 3202. A mask timing block 2-2 produces a timing for masking a ½ convolution output which is generated in case of the same continuous data.

A flip-flop (F/F) 2-3 generates a load signal to a timing block 2-4 by such a timing when the convolution output is derived. The timing block 2-4 generates a reference signal of a phase locked loop (PLL) 2-6 when a reception signal is not detected. The timing block 2-4 also generates a signal in which a mask width after the synchronization was captured is different from the initial acquisition.

An oscillator (CLK) 2-5 generates a reference clock to make the timing block 2-4 operative and generates a signal of a frequency which is higher than a chip rate of the spreading code. A selector 2-7 switches the mask signal produced by the timing block 2-4 and the convolution output and outputs to the PLL 2-6.

The PLL 2-6 generates a clock of a frequency according to a difference between the leading phases of the pulses of two signals which are input.

Figure 23:
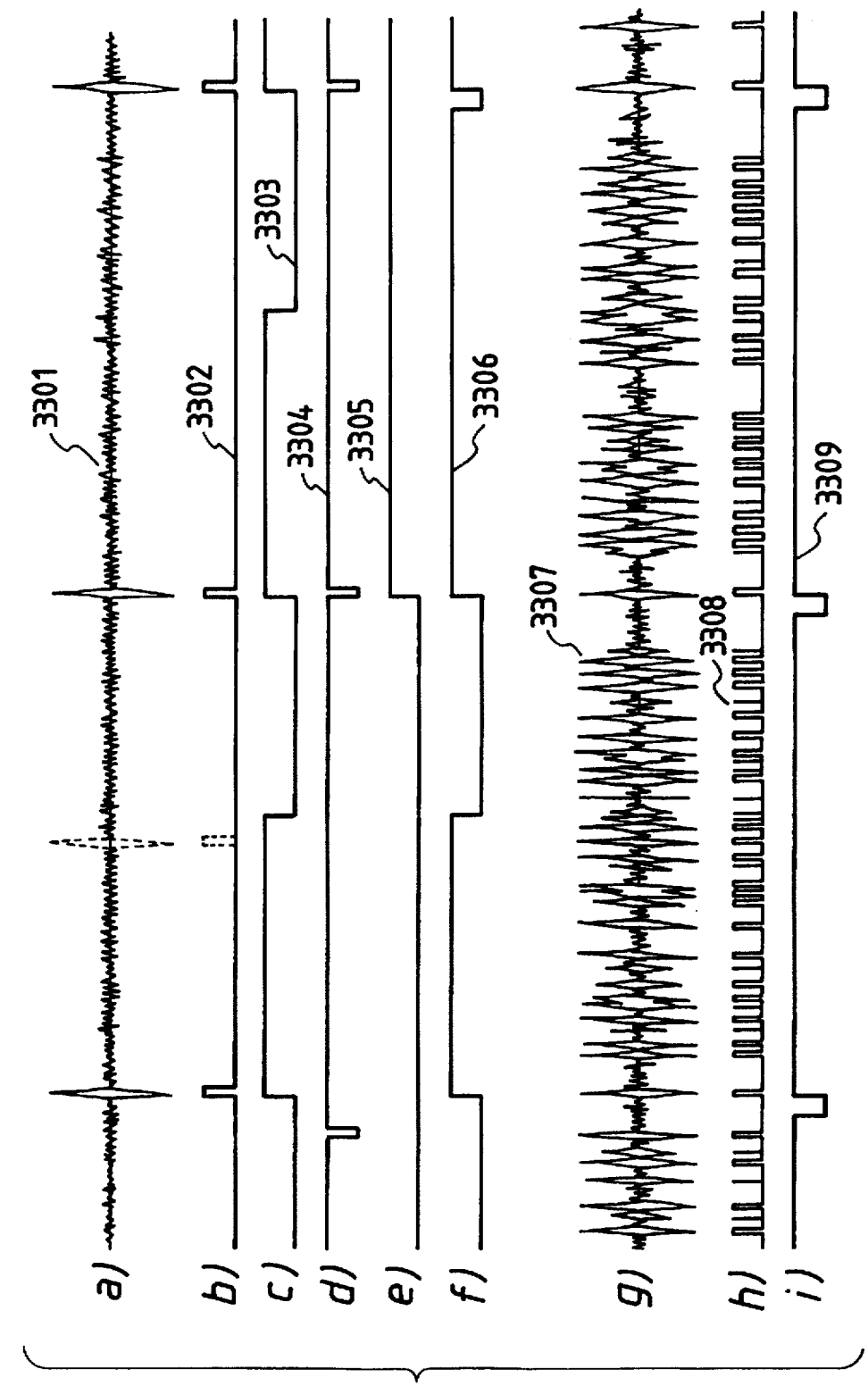
FIG. 23 is a timing chart for a reception signal and a sync operation signal in the receiving apparatus.

FIG. 23 is a timing chart showing states of the reception signal and sync operation signal in the above receiving apparatus.

First, a signal waveform 3301 is a waveform of an output of the SAW convolver 3201 at the time of transmission of only the sync code channel. A signal waveform 3302 is a waveform of a peak detection signal in the peak detecting circuit 3202.

A signal waveform 3303 is a waveform of a convolution output which was masked by the ½ mask timing produced by the mask timing block 2-2. A signal waveform 3304 is a waveform of a generation timing sinal (start signal) of the spreading code for reference of the code generator 3203. An de-spread code for demodulation is also generated by the same timing.

A signal waveform 3305 is a waveform of a signal (hereinafter, referred to as a lock signal) indicative of the acquisition of the PLL 2-6. Signal waveforms 3306 and 3309 denote waveforms of a comparison signal which is input from the selector 2-7 to the PLL 2-6.

Reference numeral 3307 denotes a signal waveform of a convolution output when the data communication code channel is turned on. Reference numeral 3308 denotes a signal waveform of the peak signal of the peak detecting circuit 3202 for the convolution output.

The operation of the embodiment will now be described hereinbelow.

Figure 24:
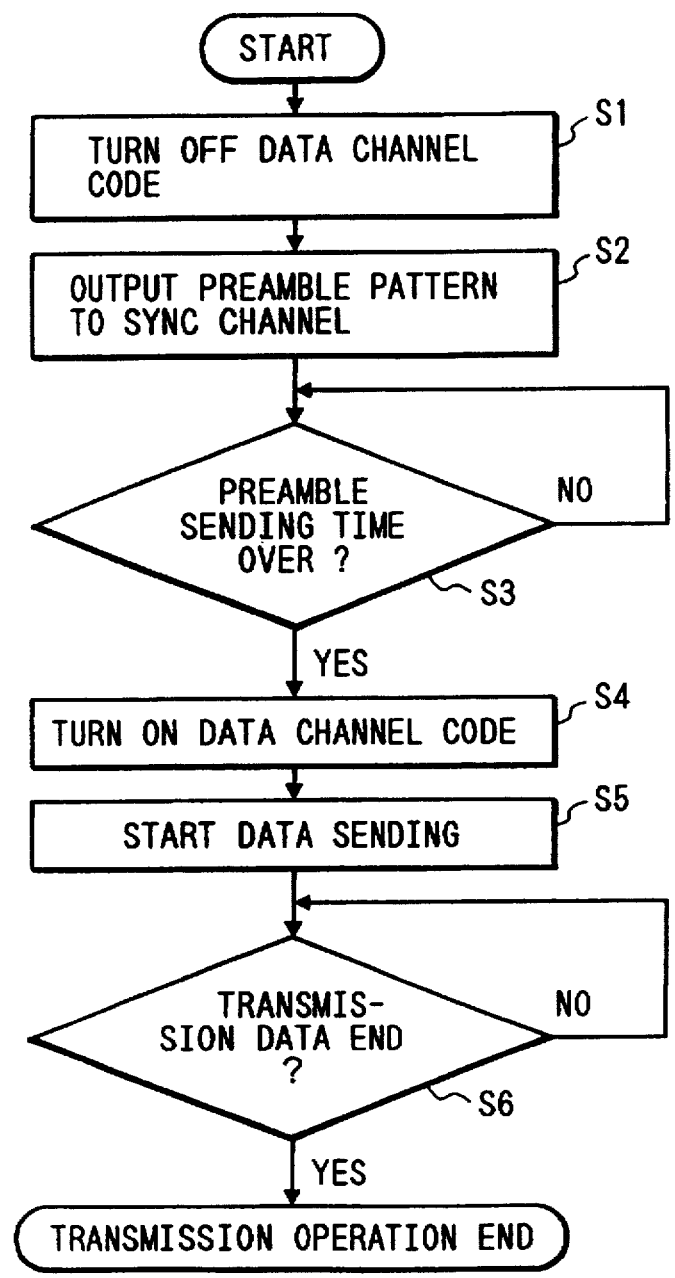
FIG. 24 is a flowchart for the transmitting apparatus.

FIG. 24 is a flowchart showing the operation at the time of start of the transmission in the control circuit of the transmitting apparatus.

First, when a data transmission request is received from an external interface (not shown), the control circuit 3104 of the transmitting apparatus transmits an output OFF signal to the output switch 3102 in the code generation circuit 3101 (step S1). The transmission of a repetitive preamble pattern of (0, 1) to the mixer 3109 is started (S2). An initial synchronization preamble transmission timer (not shown) is started. The preamble pattern is modulated by the sync channel spreading code which is generated from the code generation circuit 3101 and, after that, the carrier is modulated by the mixer 3108 and is transmitted.

In the receiving apparatus, first, the frequency of clock which is supplied from the oscillator 2-5 is divided by the timing block 2-4, thereby producing a signal having the same period as that of a data rate. The resultant signal is input to one side of the PLL 2-6 through the selector 2-7 and is compared with the code generation timing signal 3304 of the code generation circuit 3203, thereby establishing the synchronization. The synchronized PLL clock generates a chip (bit) rate frequency of the spreading code. The spreading code is generated by such a clock. On the basis of the code $PN_0$ generated, the spreading signal for reference is input to one side of the SAW convolver 3201 and the apparatus waits for the input of the reception signal. The de-spread codes $PN_1$ to $PN_n$ are input to the demodulation circuit 3210.

When the sync spreading code channel signal which was modulated by the preamble pattern is received from the transmission side, the convolution output 3301 is obtained from the SAW convolver 3201. The convolution output 3301 becomes the peak signal 3302 of the logic level in the peak detection circuit 3202 and is latched by the flip-flop 2-1 for latching the convolution output and is transmitted to the mask timing block 2-2, F/F 2-3 for generating the load signal, and selector 2-7, respectively.

When receiving the signal 3302, the mask timing block 2-2 starts to count the clocks of the PLL 2-6 from the input signal. After only a time longer than ½ of the code period (time shorter than the code period) was counted, a mask cancellation signal is output to the F/F 2-1 for latching the convolution output, thereby stopping the counting operation.

The F/F 2-3 for generating the load signal receives the convolution output signal 3302 and outputs the load signal to the timing block 2-4. When receiving the load signal, the timing block 2-4 newly starts to divide the frequency of the clock of the oscillator 2-5 from the load timing. An output waveform of the timing block 2-4 at this time is equal to or less than a duty 50%.

The selector 2-7 outputs the waveform of the timing block 2-4 for an interval during which the output of the timing block 2-4 is at the high level. The selector 2-7 outputs the convolution output waveform 3303 only for an interval of the low level output.

Consequently, in the case where the output of a reference clock which is output from the timing block 2-4 when the output level of the peak detection circuit 3202 rises during the waiting time of the signal reception is set to the low level, the foregoing convolution output is output from the selector 2-7. When it is set to the high level, the peak detection output is blocked by the selector 2-7 and a leading edge of the next convolution output is generated from the selector 2-7 with a delay time of one period. The output 3306 of the selector 2-7 is input to the PLL 2-6 and a pull-in is executed together with the code generation timing signal 3304 which is generated from the code generation circuit 3203. The initial acquisition is performed.

When the synchronization is established between the convolution output timing signal 3303 and the code generation timing signal 3304 by the PLL 2-6 as mentioned above and the initial synchronizing operation is finished, the PLL 2-6 supplies the lock signal 3305 to the peak detection circuit 3202 and timing block 2-4.

When receiving the lock signal 3305, the peak detection circuit 3202 masks the convolution output 3301 which was input for an interval during which the signal of the selector 2-7 is set to the high level as a sync holding operation, thereby preventing that the output 3301 is supplied to the F/F 2-1 for latching the convolution output.

When receiving the lock signal 3305, the timing block 2-4 changes a duty ratio of the clock which is output to the selector 2-7 as a tracking operation, thereby shaping the signal waveform to a waveform such that the interval of the low level signal is equal to a period of time as many as a few chips (of the number which is determined in accordance with a limit value on the basis of the cross correlation characteristics of the spreading codes which are used and is equal to or less than such a value) of the spreading code period. The waveform shaped signal which is input to the selector 2-7 has a width after one chip before the interval of the low level signal corresponds to a few chips of the timing of the normalized convolution output. When the acquisition is finished, the next convolution output is derived for such an interval of the low level signal.

If a drop-out occurs in the convolution output, a pseudo correlation output is given from the timing block 2-4 to the selector 2-7 at a position which is delayed by a time of about one chip of the spreading code from the position of a convolution output that will come next. A pseudo peak mask timing by the mutual correlation is held.

In the transmitting apparatus, when the initial sync preamble transmission timer set time in the control circuit 3104 mentioned above elapses (S3), the control circuit 3104 turns on the output switch 3102 in the code generation circuit 3101 (S4). The spreading code channel for data communication is opened and the transmission of the parallel data from the serial/parallel conversion circuit 3105 is subsequently started in accordance with the code generation timing (S5).

When the data communication code channel of the transmitting apparatus is enabled, the pseudo peak by the cross correlation of the spreading code channels is output as a convolution output that is derived by the receiving apparatus and is set to the waveform 3307 in FIG. 23. The peak detection signal of the convolution output is set to the waveform 3308 shown in FIG. 23.

In the peak detecting circuit 3202, however, when the lock signal 3305 is received, the signals at positions other than the position near the foregoing normalizing position of the correlation peak signal 3308 are masked by the mask information of the selector 2-7.

Figure 25:
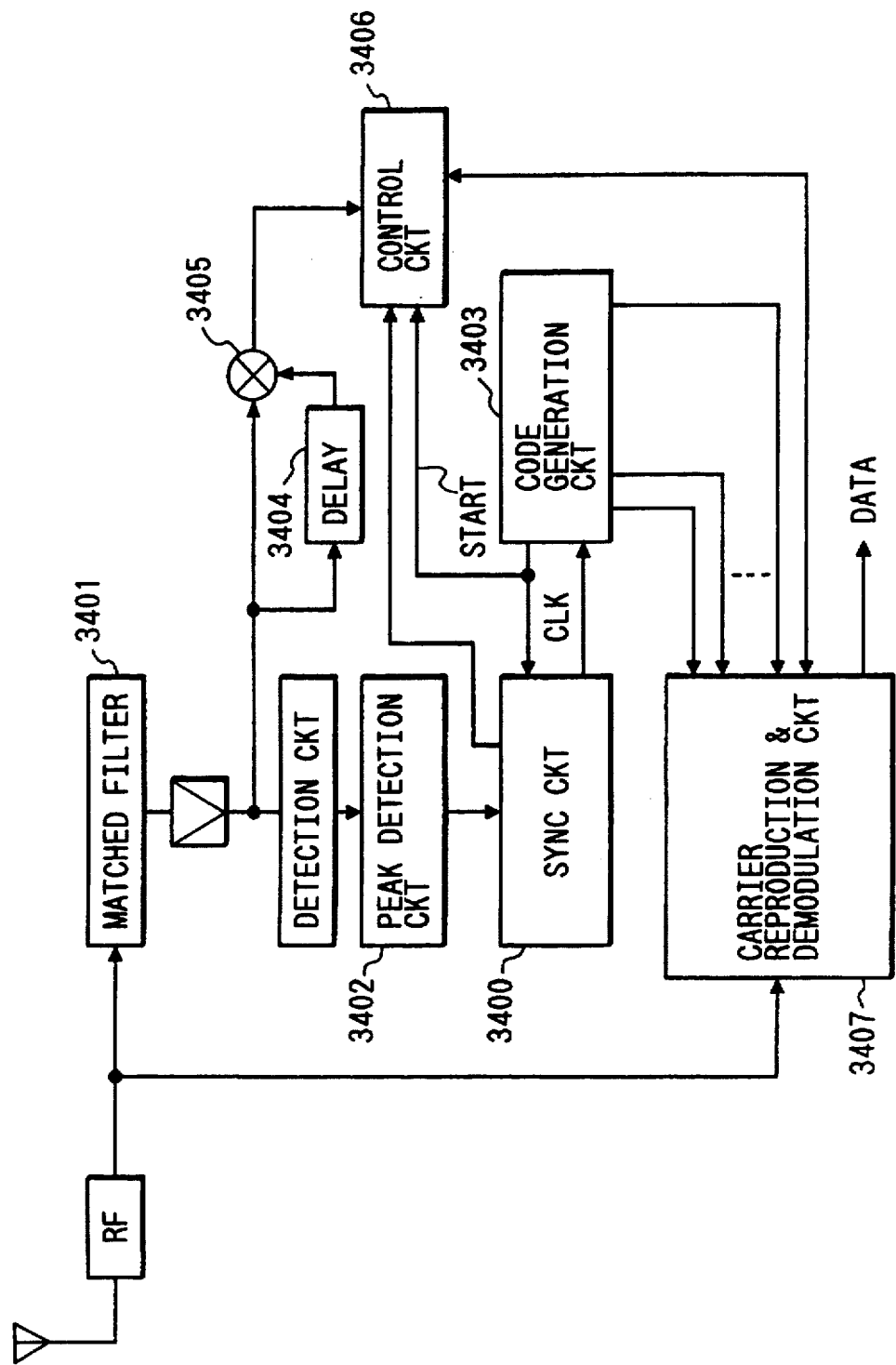
FIG. 25 is a constructional diagram of a receiving apparatus in an eighth spread spectrum communication system embodying the invention.
Figure 26:
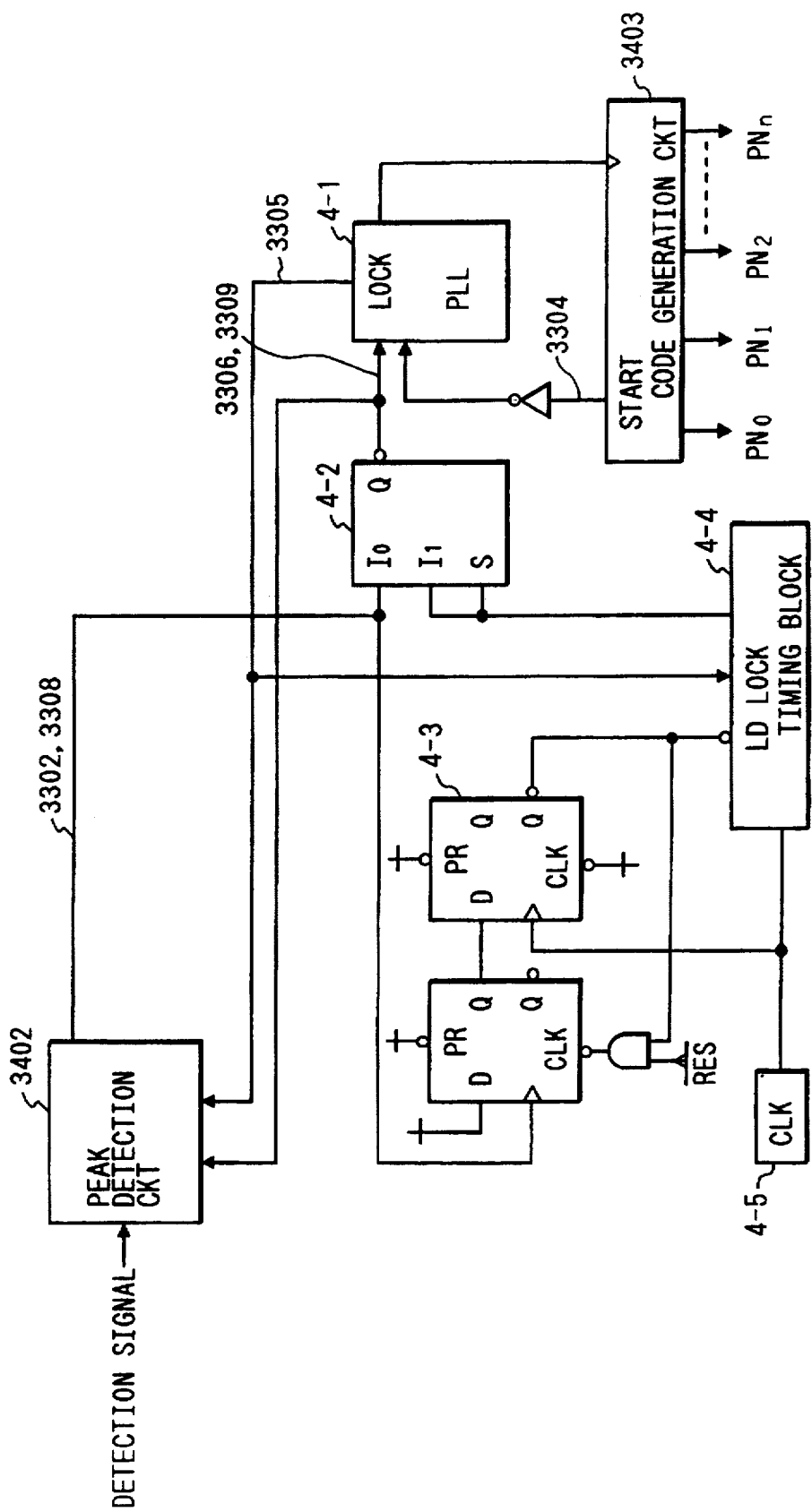
FIG. 26 is a constructional diagram of a sync circuit.

FIG. 25 is a block diagram showing a construction of a receiving apparatus in the eighth spread spectrum communication system embodying the invention. FIG. 26 is a block diagram showing a construction of a sync circuit 3400 in the eighth embodiment. Since a transmitting apparatus is similar to the foregoing seventh embodiment, its description is omitted.

A matched filter 3401 is a correlator for obtaining a correlation between the reception signal and a predetermined spreading code channel for synchronization. A peak detection circuit 3402 detects the peak of an envelope after the envelope of an output of the matched filter 3401 was detected.

A code generation circuit 3403 generates a spreading code for demodulation. The sync circuit 3400 executes an acquisition operation. A delay line 3404 executes a delay detection demodulation with respect to an output of the matched filter 3401. A mixer 3405 multiplexes the output of the matched filter 3401 and an output of the delay line 3404.

A control circuit 3406 controls the demodulating operation of a data transmission spreading code channel by transmission state information included in the sync spreading code channel. A carrier reproduction demodulation circuit 3407 demodulates a reception data spreading code channel in a manner similar to the carrier reproduction demodulation circuit 3210 in FIG. 21.

In the sync circuit 3400 shown in FIG. 26, a flip-flop (F/F) 4-3 generates a load signal to a timing block 4-4 by a timing when the matched filter output is derived. When the reception signal is not detected, the timing block 4-4 generates a reference signal of a PLL 4-1 and generates a signal in which a mask width after the synchronization was captured is different from that at the time of the initial acquisition.

An oscillator 4-5 generates a reference clock for making the timing block 4-4 operative and outputs a frequency that is equal to or higher than a chip rate of the spreading code. A selector 4-2 switches the mask signal produced by the timing block 4-4 and the matched filter output and outputs to the PLL 4-1.

The PLL 4-1 generates a clock of a frequency according to a difference between the leading phases of two pulses which are input.

The operation in the embodiment will now be described hereinbelow.

In the receiving apparatus, first, the frequency of the clock which is supplied from the oscillator 4-5 in FIG. 26 is divided by the timing block 4-4, thereby producing the signal of the same period as the data rate. The signal is subsequently input to one side of the PLL 4-1 through the selector 4-2 and is compared with the code generation timing signal (start signal) 3304 of the code generation circuit 3403, thereby performing the synchronization. The code generation timing signal 3304 is also given as a data sampling clock of the sync channel demodulation to the control circuit 3406.

As for the synchronized PLL clock, a chip (bit) rate frequency of the spreading code is generated and the spreading code is generated by the clock. The generated code is input as an de-spread code to the demodulation circuit 3407.

In a manner similar to the seventh embodiment, when the sync spreading code channel signal which was modulated by the preamble pattern is received from the transmission side, the matched filter output 3301 is obtained from the matched filter 3401. Such a signal is used as a peak signal 3302 of the logic level in the peak detection circuit 3402 and is transmitted to the F/F 4-3 for generating a load signal and to the selector 4-2, respectively.

When receiving the matched filter output signal 3302, the F/F 4-3 for generation of the load signal outputs the load signal to the timing block 4-4. When receiving the load signal, the timing block 4-4 newly starts to divide the frequency of the clock of the oscillator 4-5 from the load timing. A duty ratio of the output waveform of the timing block 4-4 at this time is equal to or less than 50%.

The selector 4-2 outputs the waveform of the timing block 4-4 in an interval during which the output of the timing clock 4-4 is set to the high level. The selector 4-2 outputs the matched filter output waveform 3302 only in an interval of the low level output.

Therefore, in the case where the output of the reference clock which is generated from the timing block 4-4 when the output of the peak detection circuit 3402 rises during the waiting state of the signal reception, the timing signal of the matched filter output mentioned above is generated from the selector 4-2. On the other hand, when the reference clock output is set to the high level, the peak detection output is blocked by the selector 4-2 and the leading edge of the next matched filter output is generated from the selector 4-2 with a delay time of one period. The selector output 3306 is input to the PLL 4-1 and a pull-in is performed together with the code generation timing signal 3304 which is generated from the code generation circuit 3403. The initial acquisition is executed.

In this manner, when the synchronization between the matched filter output timing signal 3302 and the code generation timing signal 3304 is established by the PLL 4-1 and the initial synchronizing operation is finished, the PLL 4-1 outputs the lock signal 3305 to the peak detection circuit 3402 and timing block 4-4.

When receiving the lock signal 3305, the peak detection circuit 3402 masks the matched filter output 3301 which was input for an interval during which the signal of the selector 4-2 is at the high level as a tracking operation.

When receiving the lock signal 3305, the timing block 4-4 changes a duty ratio of the clock which is supplied to the selector 4-2 as a tracking operation, thereby shaping the waveform to a waveform such that an interval of the low level signal is equal to a period of time as many as a few chips (of the number which is decided in accordance with a limit value on the basis of the cross correlation characteristics of the spreading codes which are used and is equal to or less than such a value) of the spreading code period. The waveform shaped signal which is input to the selector 4-2 has a width after one chip before the interval of the low level signal corresponds to a few chips of the timing of the normalized convolution output. When the acquisition is finished, the next matched filter output is derived for such an interval of the low level signal.

If a drop-out occurs in the matched filter output, a pseudo correlation output is given from the timing block 4-4 to the selector 4-2 at a position which is delayed by about a time corresponding to one chip of the spreading code from the position of a prescribed matched filter output which will come next, thereby holding the pseudo peak mask timing due to the cross correlation.

In the control circuit 3406 which has received the lock signal 3305, the demodulation signal input from the mixer 3405 is sampled by the code generation timing signal 3304, the sync spreading code channel data is converted into the digital signal, and their contents are monitored.

The control circuit 3406 monitors the data which is transmitted by the sync spreading code channel. When detecting a data transmission signal which is transmitted after the preamble from the transmission side, the control circuit 3406 sends a data spreading code channel enable signal to the demodulation circuit 3407. When receiving such a channel enable signal, the demodulation circuit 3407 starts a parallel/serial converting operation of the reception data and supplies the reception data to an external interface.

When the data communication code channel of the transmitting apparatus is enabled, the pseudo peak by the cross correlation of the spreading code channels is output as a matched filter output derived by the receiving apparatus and has the waveform 3307 shown in FIG. 23. The peak detection signal of the matched filter output has the waveform 3308 shown in FIG. 23.

In the peak detection circuit 3402, however, when the lock signal 3305 is received, the signals at the positions other than the positions near the normalization position of the correlation peak signal 3308 are masked by the mask information of the selector 4-2.

In the seventh and eighth embodiments, at the start of the data communication, the transmission side reduces the number of code division multiplex channels and transmits a sync preamble and increases the number of multiplex channels after the preamble was transmitted. On the reception side, the acquisition is held by using the correlation output of one correlator. After the synchronization was captured, the pseudo correlation outputs by the code channels which are multiplexed and exist at the positions other than the position near the normalized correlation output are suppressed or masked. Even when no correlation output is derived, the mask timing of the cross correlation signal is held and the pseudo correlation output in the acquisition operation and acquisition operation upon communication is suppressed.

Therefore, erroneous operations of the acquisition operation and tracking operation by the pseudo correlation output can be prevented.

Further, the number of multiplex channels can be increased and the data can be transmitted at a high speed.

On the other hand, by transmitting the transmission state signal to the spreading code channel which is used at the time of initial acquisition, it is possible to control so as to make the demodulation circuit operative only when the acquisition is finished and the number of spreading code channels is increased.

Although the present invention has been described with respect to the preferred embodiments, the invention is not limited to the foregoing embodiments but many modifications and variations are possible within the spirit and scope of the appended claims of the invention.

What is claimed is:

1. A spread spectrum receiving apparatus comprising:
  reproducing means for reproducing a carrier signal from a reception signal;
  demodulating means for demodulating the reception signal to a baseband signal on the basis of the carrier signal reproduced by said reproducing means;
  de-spreading means for de-spreading the baseband signal from said demodulating means based on a de-spreading code, and outputting transmitted data; and
  extracting means for extracting a de-spreading code clock signal from the reception signal which is not de-spread by said de-spreading means, and supplying said de-spreading means with the de-spreading code clock signal.

2. An apparatus according to claim 1, wherein said reproducing means has operating means for arithmetically operating the reception signal and the de-spreading code and detecting means for detecting a difference between phases of an output of said operating means and an output of oscillating means,
  and said oscillating means oscillates at a carrier frequency in accordance with the phase difference detected by said detecting means.

3. An apparatus according to claim 1, wherein said de-spreading means includes generating means for generating the de-spreading code in accordance with the de-spreading code clock signal.

4. An apparatus according to claim 1, wherein said extracting means extracts the de-spreading code clock signal from the reception signal which is not demodulated to the baseband signal.

5. An apparatus according to claim 1, wherein said reproducing means reproduces the carrier signal from the reception signal based on the spreading code.

6. An apparatus according to claim 1, wherein said extracting means includes a convolver for generating the de-spreading code clock signal.

7. An apparatus according to claim 1, wherein said extracting means includes a delay locked loop for generating the de-spreading code clock signal.

8. An apparatus according to claim 1, wherein said extracting means extracts the de-spreading code clock signal and a code synchronizing signal from the reception signal which is not de-spread by said de-spreading means, and
  said de-spreading means de-spreads the baseband signal based on the de-spreading code clock signal and the code synchronizing signal.

9. An apparatus according to claim 1, wherein said extracting means extracts the de-spreading code clock signal from the reception signal which is not de-spread by said de-spreading means and not demodulated to the baseband signal by said demodulating means.

10. A spread spectrum receiving apparatus comprising:
converting means for converting a reception signal into a baseband signal;
de-spreading means for de-spreading the baseband signal in accordance with a de-spreading code clock signal to output transmitted data; and
extracting means for extracting the de-spreading code clock signal from the reception signal which is not de-spread by said de-spreading means, and supplying said de-spreading means with the de-spreading code clock signal.

11. An apparatus according to claim 10, wherein said de-spreading means includes generating means for generating a de-spreading code in accordance with the de-spreading code clock signal.

12. An apparatus according to claim 10, wherein said extracting means extracts the de-spreading code clock signal from the reception signal which is not converted into the baseband signal.

13. An apparatus according to claim 10, wherein said converting means includes reproducing means for reproducing a carrier signal based on a de-spreading code, and converts the reception signal into the baseband signal based on the carrier signal.

14. An apparatus according to claim 13, wherein said reproducing means includes processing means for processing the reception signal and the de-spreading code, oscillating means, and control means for controlling said oscillating means based on a phase difference between outputs of said processing means and said oscillating means such that said oscillating means generates the carrier signal.

15. An apparatus according to claim 10, wherein said extracting means includes a convolver for generating the de-spreading code clock signal.

16. An apparatus according to claim 10, wherein said extracting means includes a delay locked loop for generating the de-spreading code clock signal.

17. An apparatus according to claim 10, wherein said extracting means extracts the de-spreading code clock signal and a code synchronizing signal from the reception signal which is not de-spread by said de-spreading means, and
said de-spreading means de-spreads the baseband signal based on the de-spreading code clock signal and the code synchronizing signal.

18. An apparatus according to claim 10, wherein said extracting means extracts the de-spreading code clock signal from the reception signal which is not de-spread by said de-spreading means and not converted to the baseband signal by said converting means.

19. A spread spectrum receiving apparatus comprising:
converting means for converting a reception signal based on a de-spreading code;
de-spreading means for de-spreading a converted reception signal from said converting means, and outputting transmitted data; and
extracting means for extracting a de-spreading code clock signal from the reception signal which is not de-spread by said de-spreading means, and supplying said de-spreading means with the de-spreading code clock signal.

20. An apparatus according to claim 19, wherein said converting means converts the reception signal into a baseband signal.

21. An apparatus according to claim 19, wherein said de-spreading means includes generating means for generating a de-spreading code in accordance with the de-spreading code clock signal.

22. An apparatus according to claim 21, wherein said extracting means extracts the de-spreading code clock signal from the reception signal which is not converted into the baseband signal.

23. An apparatus according to claim 21, wherein said converting means includes reproducing means for reproducing a carrier signal based on the de-spreading code, and converts the reception signal into the baseband signal based on the carrier signal.

24. An apparatus according to claim 23, wherein said reproducing means includes processing means for processing the reception signal and the de-spreading code, oscillating means, and control means for controlling said oscillating means based on a phase difference between outputs of said processing means and said oscillating means such that said oscillating means generates the carrier signal.

25. An apparatus according to claim 21, wherein said extracting means includes a convolver for generating the de-spreading code clock signal.

26. An apparatus according to claim 21, wherein said extracting means includes a delay locked loop for generating the de-spreading code clock signal.

27. An apparatus according to claim 19, wherein said extracting means extracts the de-spreading code clock signal and a code synchronizing signal from the reception signal which is not de-spread by said de-spreading means, and
said de-spreading means de-spreads the converted reception signal based on the de-spreading code clock signal and the code synchronizing signal.

28. An apparatus according to claim 19, wherein said extracting means extracts the de-spreading code clock signal from the reception signal which is not de-spread by said de-spreading means and not converted based on the de-spreading code by said converting means.

29. A method for receiving a spread spectrum signal, comprising the steps of:
converting a reception signal into a baseband signal;
de-spreading the baseband signal in accordance with a de-spreading code clock signal for reproducing transmitted data; and
extracting the de-spreading code clock signal from the reception signal which is not de-spread in said de-spreading step.

30. A method according to claim 29, wherein said de-spreading step includes a generating step of generating a de-spreading code in accordance with the de-spreading code clock signal.

31. A method according to claim 29, wherein the de-spreading code clock signal is extracted in said extracting step from the reception signal which is not converted into the baseband signal.

32. A method according to claim 29, wherein said converting step includes a reproducing step of reproducing a carrier signal based on a de-spreading code, and converts the reception signal into the baseband signal based on the carrier signal.

33. A method according to claim 32, wherein said reproducing step includes a processing step of processing the reception signal and the de-spreading code, and a controlling step of controlling an oscillator based on a phase difference between a processing output of said processing and an output of the oscillator such that the oscillator generates the carrier signal.

34. A method according to claim 29, wherein the de-spreading code clock signal is extracted by using a convolver.

35. A method according to claim 29, wherein the de-spreading code clock signal is extracted by using a delay locked loop.

36. A method according to claim 29, wherein the de-spreading code clock signal and a code synchronizing signal are extracted in said extracting step, from the reception signal which is not de-spread in said de-spreading step, and the baseband signal is de-spread in said de-spreading step in accordance with the de-spreading code clock signal and the code synchronizing signal.

37. A method according to claim 29, wherein the de-spreading code clock signal is extracted in said extracting step, from the reception signal which is not de-spread in said de-spreading step and not converted into the baseband signal in said converting step.

38. A method for receiving a spread spectrum signal, comprising the steps of:

converting a reception signal based on a spreading code;

de-spreading a converted reception signal for reproducing transmitted data; and extracting a de-spreading code clock signal from the reception signal which is not de-spread in said de-spreading step, wherein the converted reception signal is de-spread in said de-spreading step in accordance with the de-spreading code clock signal.

39. A method according to claim 38, wherein said de-spreading step includes a generating step of generating a de-spreading code in accordance with the de-spreading code clock signal.

40. A method according to claim 38, wherein the reception signal is converted into a baseband signal in said converting step.

41. A method according to claim 40, wherein the de-spreading code clock signal is extracted in said extracting step from the reception signal which is not converted into the baseband signal.

42. A method according to claim 40, wherein said converting step includes a reproducing step of reproducing a carrier signal based on a de-spreading code, and converts the reception signal into the baseband signal based on the carrier signal.

43. A method according to claim 42, wherein said reproducing step includes a processing step of processing the reception signal and the de-spreading code, and a controlling step of controlling an oscillator based on a phase difference between a processing output of said processing and an output of the oscillator such that the oscillator generates the carrier signal.

44. A method according to claim 38, wherein the de-spreading code clock signal is extracted by using a convolver.

45. A method according to claim 38, wherein the de-spreading code clock signal is extracted by using a delay locked loop.

46. A method according to claim 38, wherein the de-spreading code clock signal and a code synchronizing signal are extracted in said extracting step, from the reception signal which is not de-spread in said de-spreading step, and the converted reception signal is de-spread in said de-spreading step in accordance with the de-spreading code clock signal and the code synchronizing signal.

47. A method according to claim 38, wherein the de-spreading code clock signal is extracted in said extracting step, from the reception signal which is not de-spread in said de-spreading step and not converted based on the spreading code in said converting step.

* * * * *